(12) United States Patent
Marshall et al.

(10) Patent No.: US 12,071,556 B2
(45) Date of Patent: Aug. 27, 2024

(54) CURABLE INK COMPOSITION

(71) Applicant: Domino Printing Sciences Plc, Cambridge (GB)

(72) Inventors: Jean Elizabeth Marshall, Cambridge (GB); Martin Thompson, Cambridge (GB)

(73) Assignee: Domino Printing Sciences PLC, Cambridge (GB)

( * ) Notice: Subject to any disclaimer, the term of this patent is extended or adjusted under 35 U.S.C. 154(b) by 342 days.

(21) Appl. No.: 17/437,378

(22) PCT Filed: Mar. 6, 2020

(86) PCT No.: PCT/EP2020/055969
§ 371 (c)(1),
(2) Date: Sep. 8, 2021

(87) PCT Pub. No.: WO2020/182640
PCT Pub. Date: Sep. 17, 2020

(65) Prior Publication Data
US 2022/0145109 A1    May 12, 2022

(30) Foreign Application Priority Data
Mar. 8, 2019  (GB) .................... 1903147

(51) Int. Cl.
*C09D 11/328* (2014.01)
*B41M 5/00* (2006.01)
(Continued)

(52) U.S. Cl.
CPC ......... *C09D 11/328* (2013.01); *B41M 5/0023* (2013.01); *C09B 62/0025* (2013.01);
(Continued)

(58) Field of Classification Search
CPC ............. B41M 5/0023; C09B 62/0025; C09D 11/037; C09D 11/101; C09D 11/107; C09D 11/328
See application file for complete search history.

(56) References Cited

U.S. PATENT DOCUMENTS

| 4,943,617 A | 7/1990 | Etzbach et al. |
| 5,055,602 A | 10/1991 | Melpolder |

(Continued)

FOREIGN PATENT DOCUMENTS

| EP | 666289 A1 | 8/1995 |
| EP | 1739135 A2 | 1/2007 |

(Continued)

OTHER PUBLICATIONS

Fleischmann et al., Polymers and Dyes: Developments and Applications, Polymers 2015, 7, 717-746.
(Continued)

*Primary Examiner* — Anh T Vo
(74) *Attorney, Agent, or Firm* — Stites & Harbison PLLC; Richard S. Myers, Jr.

(57) ABSTRACT

Provided is a curable ink composition, in particular a curable inkjet ink composition. The ink composition has a dye monomer, a carrier monomer and an initiator. The dye monomer has a chromophore moiety that is covalently bonded to at least one polymerizable functional group and is present at 1.0 wt % or more based on total weight of the ink composition. The carrier monomer has at least one polymerizable functional group and is present in at 50 wt % or more based on total weight of the ink composition. The ink compositions are suitable for radiation curing such as UV curing and have good cure properties or light fastness properties.

18 Claims, 6 Drawing Sheets

(51) Int. Cl.
 *C09B 62/002* (2006.01)
 *C09D 11/037* (2014.01)
 *C09D 11/101* (2014.01)
 *C09D 11/107* (2014.01)

(52) U.S. Cl.
 CPC .......... *C09D 11/037* (2013.01); *C09D 11/101* (2013.01); *C09D 11/107* (2013.01)

(56) References Cited

U.S. PATENT DOCUMENTS

| | | | |
|---|---|---|---|
| 5,362,812 | A | 11/1994 | Holmes et al. |
| 6,870,063 | B2 | 3/2005 | Cyr et al. |
| 7,030,244 | B2 | 4/2006 | Cyr et al. |
| 8,741,508 | B2 | 6/2014 | Fujie et al. |
| 8,865,929 | B2 | 10/2014 | Xu et al. |
| 2002/0128343 | A1* | 9/2002 | Cyr ................ C08F 20/38 522/107 |
| 2005/0049425 | A1 | 3/2005 | Pearson et al. |
| 2007/0100018 | A1 | 5/2007 | Hagting et al. |
| 2009/0082553 | A1 | 3/2009 | Satake et al. |
| 2009/0087575 | A1* | 4/2009 | Matsumura ...... C09B 67/0033 522/167 |
| 2016/0040013 | A1 | 2/2016 | Shida et al. |
| 2017/0275814 | A1 | 9/2017 | Cornelius et al. |

FOREIGN PATENT DOCUMENTS

| | | |
|---|---|---|
| EP | 2053095 A2 | 4/2009 |
| EP | 2406327 B1 | 8/2013 |
| EP | 3444304 A1 | 2/2019 |
| JP | 2004-506063 A1 | 2/2004 |
| JP | 2014-152251 A | 8/2014 |
| JP | 2017-518413 A | 7/2017 |
| WO | WO 02/12403 A2 | 2/2002 |
| WO | WO2015/060397 A1 | 4/2015 |

OTHER PUBLICATIONS

Search Report dated Jul. 30, 2019 issued in Application No. 1903147.5.
International Search Report dated May 29, 2020 issued in Application No. PCT/EP2020/055969.
Japanese Office Action Nov. 6, 2023 on 2021-553400.

* cited by examiner

CURABLE INK COMPOSITION

CROSS REFERENCE TO RELATED APPLICATIONS

This application is a § 371 National State Application of PCT/EP2020/055969 filed Mar. 6, 2020 which claims priority to GB 1903147.5 filed Mar. 8, 2019.

RELATED APPLICATION

The present case claims priority to, and the benefit of, GB 1903147.5 filed on 8 Mar. 2019, the contents of which are hereby incorporated by reference in their entirety

FIELD OF THE INVENTION

The present invention relates to a curable ink composition, in particular a curable inkjet ink composition. In particular, the ink is for radiation curing, for example, UV curing.

BACKGROUND OF THE INVENTION

In ink compositions a number of factors must be balanced in order to avoid or reduce the problems associated with ink compositions.

For curable inks, one or more monomers are present in the ink typically with a polymerization initiator, such as a photoinitiator. After the ink composition is printed, the monomers polymerise to provide the cured printed deposit. The polymerization process is often referred to as curing. In the case of UV curable inks, the curing process involves treating the printed ink composition with UV radiation for example UV light from a light-emitting diode (LED) or mercury vapour arc lamp.

The monomers may be mono-functional or multi-functional (e.g. di-functional or tri-functional) monomers. In the case of UV curing the polymerization initiator is typically a photoinitiator.

Curable inks such as UV curable inks, provide a number of preferable features compared to other types of inks. For example, curable inks can have a low volatile organic chemical content.

UV-curable inks are usually coloured by the inclusion of pigments. Pigments are powdered substances that are relatively insoluble in the ink but can remain suspended within it.

Soluble dye compounds are not commonly used in UV-curable inks, for example, due to their tendency to degrade under strong UV light sources.

Pigments are typically more expensive than dyes and they require an extra 'milling' step in ink manufacture (where the pigment is ground sufficiently finely to be well-suspended within the ink). Pigments can be more susceptible to printer nozzle blocking than dyes.

One of the most significant challenges for the formulator of a UV-curable ink is how to keep the coloured pigments suspended adequately in the monomeric solvent. In addition to optimisation of the milling conditions, it is necessary to adequately match the desired pigment to the monomers and other additives in the ink, so as to create stable dispersions.

The ability to include dyes in an ink formulation may address some of these problems and is therefore desirable.

However, most small-molecule dyes degrade very rapidly when subjected to UV-irradiation such as the UV radiation used during the curing process. Additionally, small-molecule dyes are known to migrate out of the printed deposit, in particular when a solvent is applied.

In order for dyes to be used in UV curable inks, the dye must have certain properties such as the ability to withstand the UV radiation used to cure the ink, solubility in the ink composition and compatibility with printer hardware. For example, for drop on demand ink jet printing, inks typically need to have a low viscosity to be compatible with the printer hardware.

One solution to the problem of UV degradation of dyes is the provision of 'macromolecular dyes', which are polymers that contain chromophores covalently bound into the polymer chain. These macromolecular dyes are not commercially available and require multiple synthetic steps. The dyes also have a relatively high molecular weight which may increase viscosity.

It is also desirable for an ink to produce a printed deposit that maintains its colouration (i.e. is colour-fast) over time, has good cure properties and good adhesion to the substrate.

It is an object of the present invention to provide ink compositions that have some of the above desirable characteristics. In particular, it is an object of the invention to provide dye compounds that are stable to UV radiation and provide compositions with good cure and colour fastness in the printed deposit.

It is an alternative and/or additional object of the present invention to overcome or address the problems of prior art ink compositions by using the ink compositions of the invention or to at least provide a commercially useful alternative thereto.

SUMMARY OF THE INVENTION

The present invention seeks to provide an ink composition which is suitable for curing and has good cure properties and/or good adhesion properties. In particular, the present invention seeks to provide a curable ink composition for use in drop on demand inkjet printing such as piezoelectric drop on demand inkjet printing.

Accordingly, in one aspect the present invention provides a curable ink composition comprising a dye monomer, a carrier monomer and an initiator. The dye monomer has a chromophore moiety covalently bonded to at least one polymerizable functional group. The dye monomer is present at 1.0 wt % or more based on total weight of the ink composition. The carrier monomer has at least one polymerizable functional group and is present in at 50 wt % or more based on total weight of the ink composition. The carrier monomer may be a single monomer or may be a combination of two or more monomers.

In this way, an ink composition with good cure and light-fastness is provided.

It is proposed that the dye moiety is stabilised by being covalently bound into the polymer network during the curing process.

In another aspect the present invention provides a printed deposit formed from the curable ink composition of the invention. The printed deposit comprises a cured polymer film formed by polymerisation of dye monomer and the carrier monomer.

The curable ink composition is compatible with the components of a printer, for example an inkjet printer, and more particularly a drop on demand inkjet printer, such as a piezoelectric drop on demand inkjet printer. The curable ink composition is suitable for application directly onto products and/or product packaging to achieve high quality images.

Preferably the curable ink composition described herein has a viscosity of about 0.5 to 30 mPa·s, more preferably from 1 to 20 mPa·s and even more preferably from 5 to 20 mPa·s at 25° C. Preferably the curable ink composition described herein has a viscosity of less than 25 mPa·s, more preferably less than 15 mPa·s at 25° C. Preferably the curable ink composition described herein has a viscosity of greater than 3 mPa·s, more preferably greater than 5 mPa·s, even more preferably greater than 8 mPa·s at 25° C. The viscosity of the composition may be measured using a viscometer such as a Brookfield DV-II+ viscometer.

The Brookfield DV-II+ viscometer is a rotational viscometer which measures viscosity by measuring the torque required to turn an object in a fluid as a function of the fluid's viscosity.

Preferably the curable ink composition as described herein has a surface tension of from 20 to 50 mN/m, more preferably from 20 to 40 mN/m at 25° C. The surface tension of the composition may be measured using equipment such as a du Nouy ring tensiometer or using the pendant drop method on a KSV Cam 200 optical tensiometer.

SUMMARY OF FIGURES

FIG. 1 shows a reaction scheme for the synthesis of methacrylate-containing dyes 1a-5a.

DETAILED DESCRIPTION

Figure 1:
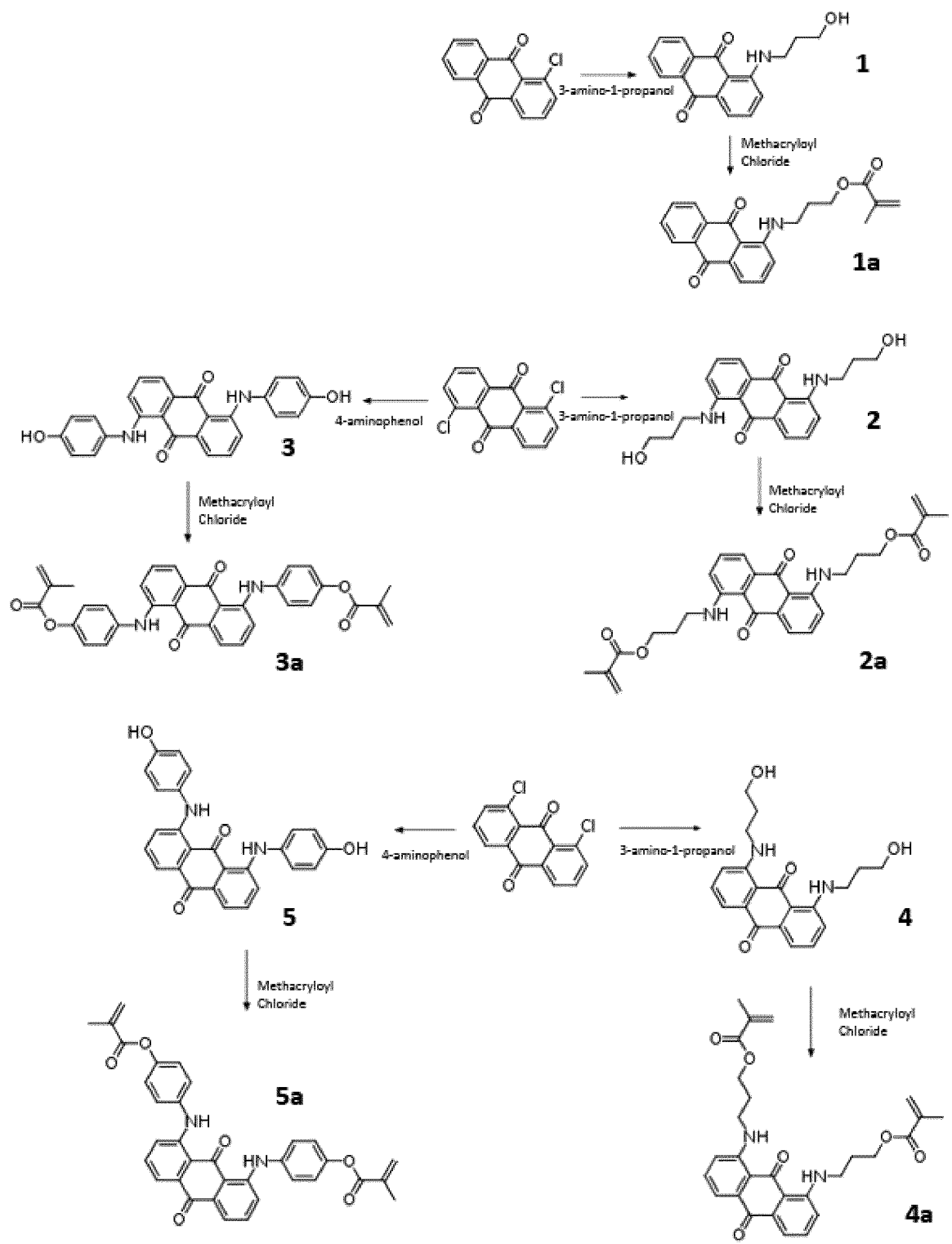

The present invention seeks to provide a curable ink composition which is suitable for radiation curing and has good cure properties and/or good adhesion properties. In particular, the present invention seeks to provide a curable inkjet ink composition for use in drop on demand inkjet printing such as piezoelectric drop on demand inkjet printing.

Accordingly, in one aspect the present invention provides a curable ink composition comprising a dye monomer, a carrier monomer and an initiator. The dye monomer has a chromophore moiety covalently bonded to at least one polymerizable functional group. The dye monomer is present at 1.0 wt % or more based on total weight of the ink composition.

The carrier monomer has at least one polymerizable functional group and is present in at 50 wt % or more based on total weight of the ink composition. The carrier monomer may be a single monomer or may be a combination of two or more monomers.

The curable ink composition may be curable inkjet ink composition.

The curable ink composition may be a UV curable ink composition for example a UV curable inkjet ink composition for use in drop on demand inkjet printing.

In another aspect the present invention provides a printed deposit formed from the ink composition of the invention. The printed deposit comprises a cured polymer film formed by polymerisation of the dye monomer and the carrier monomer.

The resulting printed ink deposit remains highly coloured after UV curing. It is proposed that the dye moiety is incorporated into the polymer structure of the cured film. In this way, the printed and cured deposit shows increased resistance to light fading compared to an unreacted, small-molecule dye on a surface.

Additionally, the dye monomer provides colour to the printed deposit meaning a pigment is no longer required in the ink. Pigments significantly increase the viscosity of curable ink compositions and so their addition to such ink compositions must be carefully controlled in order to provide a viscosity which is compatible with printer hardware. The present curable ink compositions do not exhibit increased viscosity.

The inks of the present invention are preferably for use with a piezoelectric inkjet printer such as a piezoelectric drop on demand inkjet printer. The viscosity and surface tension of the ink will be dependant up on droplet size ejected by the printer and may be adjusted within the formulation principle disclosed to best suit the properties of the printer.

Typically in such printers, ink may be heated to around 40° C. to reduce the viscosity and facilitate ejection through the nozzles. For such applications the viscosity is preferably from 5 to 10 mPa·s at the temperature of application, for example at 40° C.

The ink of the present invention may be useful for use in high speed printing applications. Such applications require the ejection of droplets at very high frequency from the nozzles of the printer and the residence time under the UV curing equipment is reduced at high speed. The inks of the present invention have low viscosities which are required for high speed ejection and exhibit improved cure allowing high speed curing processes. Preferably the ink should be capable of print speeds up to 50 m/min, more preferably up to 75 m/min and even more preferable up to 100 m/min.

Curable Ink Composition

The curable ink composition of the invention comprises a dye monomer, a carrier monomer and an initiator. The dye monomer has a chromophore moiety covalently bonded to at least one polymerizable functional group. The dye monomer is present at 1.0 wt % or more based on total weight of the ink composition. The carrier monomer has at least one polymerizable functional group and is present in at 50 wt % or more based on total weight of the ink composition. The initiator may be a photoinitiator. The carrier monomer may be a single monomer or may be a combination of two or more monomers. The curable ink composition is preferably a curable inkjet ink composition.

The term monomer used in the present application refers to a chemical compound which is capable of undergoing a polymerization either alone or with other monomers to provide a polymer. In particular, in the present application the term monomer refers to a chemical compound which is capable of undergoing polymerization when subjected to UV radiation in the presence of an initiator.

Preferably the curable ink composition described herein has a viscosity of about 0.5 to 30 mPa·s, more preferably from 1 to 20 mPa·s and even more preferably from 5 to 20 mPa·s at 25° C. Preferably the curable ink composition described herein has a viscosity of less than 25 mPa·s, more preferably less than 15 mPa·s at 25° C. Preferably the curable ink composition described herein has a viscosity of greater than 3 mPa·s, more preferably greater than 5 mPa·s, even more preferably greater than 8 mPa·s at 25° C. The viscosity of the composition may be measured using a viscometer such as a Brookfield DV-II+ viscometer.

The Brookfield DV-II+ viscometer is a rotational viscometer which measures viscosity by measuring the torque required to turn an object in a fluid as a function of the fluid's viscosity.

Dye Monomer

The curable ink composition contains a dye monomer having a chromophore moiety covalently bonded to at least one polymerizable functional group.

Methacrylated anthraquinone dyes have been synthesised in previous studies (see Dollendorf et al, Afsharnia et. al and McCurdy et al.). In these studies, the methacrylated anthraquinone dyes are polymerized either using radical initiators or by heating. In these studies, the dyes and the polymerizable compositions are for use as colour stabiliser in paints, photo-resist in semiconductors and for iris implants. Such compositions are not suitable for inks and in particular inkjet printing inks.

Chromophore containing monomers have also been discussed for use in coating applications (e.g. U.S. Pat. Nos. 7,030,244 and 6,870,063). In these cases, the chromophore containing monomer is copolymerized to for a coating. As is typical with coating compositions before polymerization, the composition contains a large amount of a reactive polymer (40 wt %) and a consequently a lower amount of monomers. The coating is applied by spreading with a blade and is cured at a slow speed (less than 8 metres/min). As such, these coating compositions are unsuitable for printing techniques and in particular inkjet such as drop on demand inkjet printing.

US 2009/0087575 A1 discusses the use of sensitising dyes. The sensitizing dye are said to absorb radiation and transfer this energy to the polymerization initiators to initiate polymerization (see [0031]). The sensitising dyes absorb UV light, preferably the sensitising dye have an absorption wavelength in the 350 nm to 450 nm range (see [0032]). The preferred absorption pattern in US 2009/0087575 A1 means that the sensitising dyes appear colourless. US 2009/0087575 A1 explains that in order to provide a coloured image, the ink composition contains a further colouring agent and this is the case in the examples which include an additional colourant.

For UV printing, it is necessary for the dye monomer to transmit sufficient light in the UV-range when present in a composition that is suitable for ink jet printing to allow the curing process to produce a good cure can occur. It is also desirable that the resulting printed deposit absorbs sufficient visible light for strong colouration and is colour-fast. The presently claimed curable ink compositions provide these properties.

The term chromophore used in this context refers to a chemical group that provides colour to the dye monomer. A chromophore provides colour because the chromophore has two separate molecular orbitals the energy difference between which corresponds to the wavelength of light in the visible spectrum. When light hits the chromophore an electron can be excited to the higher energy molecular orbital and the corresponding light is absorbed. The colouration observed is due to light that is not absorbed because the wavelength of this light does not correspond to the energy difference between the molecular orbitals. Put another way, the chromophore moiety provides colour by absorbing light in the visible spectrum.

It may be that the chromophore moiety provides colour by absorbing a majority of light in the visible light spectrum. For example, the chromophore may absorb 50% or more of light in the visible spectrum, preferably 60% or more and even more preferably 80% or more. The visible light spectrum is generally from about 380 nm to 740 nm. Absorbance may be calculated by measuring the transmittance of sample containing 5 ppm of the dye monomer using a spectrophotometer.

The chromophore moiety may be selected from an anthraquinone, an anthrapyridone, an anthrapyrimidine, an anthrapyrimidine, an anthrapyrimidone, an isothiazoloanthrone, an azo dye, a bis-azo dye, a methine, a bis-methine, a coumarin, a 3-aryl-2,5-dioxypyrroline, a 3-aryl-5-dicyanomethylene-2-oxypyrroline, a perinone, a quinophthalone, a phthalocyanine, a metal phthalocyanine, a nitroarylamine, or a 2,5-diarylaminoterephthalic ester.

Preferably, the chromophore moiety is an anthraquinone. The anthraquinone may be single anthraquinone moiety or may be a made up of two or more anthraquinone moieties such as a 7,14-dibenzpyrenequinone or indanthrone.

The term anthraquinone may be used interchangeably with anthracene-9,10-dione or 9,10-dioxoanthracene.

The anthraquinone chromophore moiety may be provided by an anthraquinone dye that is covalently bonded to a polymerizable functional group through a suitable atom of the anthraquinone dye such as a carbon, oxygen, nitrogen or sulphur atoms of the anthraquinone dye.

Anthraquinone dyes are well known and include disperse blue 14, reactive blue 4, Acid Blue 25, Alizarin, Anthrapurpurin, Carminic acid, 1,4-Diamino-2,3-dihydroanthraquinone, 7,14-Dibenzpyrenequinone, Indanthrone blue, Morindone, Oil Blue 35, Parietin, Quinizarine Green SS, Remazol Brilliant Blue R, Solvent Violet 13, 1,2,4-trihydroxyanthraquinone, Vat Orange 1.

The chromophore is covalently bonded to at least one polymerizable functional group. The covalent bond may be present between one or more suitable atoms in the chromophore, for example, by the abstraction of a hydrogen atom from a carbon, nitrogen, oxygen or sulphur atom in the chromophore. Each chromophore may be optionally substituted, for example, each chromophore may be optionally substituted with one or more halo, $NH_2$, NHR', aryl, heteroaryl, —$SO_3H$, —OH, $C_{1-6}$alkoxy, $C_{1-6}$haloalkly, $C_{1-6}$alkoxy, —COOH, —CN and glucosyl wherein R' may be $C_{1-6}$-alkyl, aryl-NH-heteroaryl, phenyl, tolyl optionally substituted with one or more groups selected from halo, —OH, —$SO_2H$, and —$SO_2CH_2CH_2OSO_3Na$.

The dye monomer contains a polymerizable functional group. The polymerizable functional group may be an alkenyl, alkynyl, acrylate, methacrylate, maleate, fumarate or acrylamide functional group. Preferably the polymerizable functional group is a methacrylate.

The term methacrylate used herein refers to a chemical compound of the following formula R—OC(=O)C(CH$_3$)=CH$_2$. In the case of the dye monomer, the R group contains the chromophore moiety. Examples of methacrylate monomers are provided below.

The term acrylate used herein refers to a chemical compound of the following formula R—OC(=O)C(H)=CH$_2$. In the case of the dye monomer, the R group contains the chromophore moiety. Examples of acrylate monomers are provided below.

The dye monomer may be a mono functional monomer or may be a multifunctional monomer. Preferably the dye monomer is multifunctional and more preferably di-functional.

The term 'mono-functional monomer' used in this context refers to a monomer having exactly one polymerizable functional group, such as radical polymerisation.

The term 'multi-functional monomer' used in this context refers to a monomer having two or more (i.e. more than one) polymerizable functional groups, such as radical polymerisation. For example, a di-functional monomer is a type of multifunctional monomer having exactly two polymerizable functional groups, such as radical polymerisation.

In some embodiments, the dye monomer is an anthraquinone methacrylate, preferably an anthraquinone dimethacrylate.

Examples of preferred dye monomers include: 3-[(9,10-dioxoanthracen-1-yl)amino]propyl 2-methylprop-2-enoate, 3-{[5-({3-[(2-methylprop-2-enoyl)oxy]propyl}amino)-9,10-dioxoanthracen-1-yl] amino}propyl 2-methylprop-2-enoate, 4-{[5-({4-[(2-methylprop-2-enoyl)oxy]phenyl}amino)-9,10-dioxoanthracen-1-yl] amino}phenyl 2-methylprop-2-enoate, 3-{[8-({3-[(2-methylprop-2-enoyl)oxy]propyl}amino)-9,10-dioxoanthracen-1-yl]amino}propyl 2-methylprop-2-enoate, and 4-{[8-({4-[(2-methylprop-2-enoyl)oxy]phenyl}amino)-9,10-dioxoanthracen-1-yl]amino}phenyl 2-methylprop-2-enoate.

The amount of dye monomer in the curable ink composition is 0.5 wt % or more based on the total weight of the ink composition.

Preferably, the dye monomer is present at 1.0 wt % or more based on total weight of the ink composition, preferably 2 wt % or more, and even more preferably 4 wt % or more.

Preferably, the dye monomer is present at 30 wt % or less based on total weight of the ink composition, more preferably 20 wt % or less and even more preferably 10 wt % or less.

The dye monomer may be present in an amount that is in a range with the upper and lower limits selected from the amounts described above. For example, the dye monomer may be present at 1.0 to 10 wt % based on total weight of the ink composition.

Preferably, the dye monomer has a molecular weight, such as a weight average molecular weight (Mw) greater than 100, more preferably greater than 200 and even more preferably greater than 300.

Preferably, the dye monomer has a molecular weight, such as a weight average molecular weight (Mw) less than 2000, more preferably less than 1500, and even more preferably less than 1,000.

The dye monomer may have a molecular weight, such as a weight average molecular weight (Mw) that is in a range with the upper and lower limits selected from the amounts described above. Preferably, the dye monomer has a molecular weight, such as a weight average molecular weight (Mw) between 100 and 2000, more preferably between 100 and 2,000, more preferably between 100 and 1,000, more preferably between 200 and 1,000 and even more preferably between 300 and 1,000.

Carrier Monomer

The curable ink composition contains a carrier monomer. The carrier monomer has at least one functional group that can undergo polymerization and is present in at 50 wt % or more based on total weight of the ink composition.

The carrier monomer may be a single monomer or may be a combination of two or more monomers. Preferably, the carrier monomer is a single monomer.

The polymerizable functional group of the carrier monomer may be an alkenyl, alkynyl, acrylate, methacrylate, maleate, fumarate, an acrylamide functional group or a mixture thereof. Preferably the polymerizable functional group is an acrylate.

The carrier monomer is selected to be compatible with the dye monomer. In this way, the carrier monomer and dye monomer will copolymerise.

The carrier monomer may be mono functional or may be multifunctional. Preferably the carrier monomer is multi-functional and more preferably di-functional. In the case where the carrier monomer is a combination of two or more monomers, each monomer is preferably multifunctional and more preferably di-functional.

It is proposed that multifunctional monomers are more effectively incorporated into the network than monofunctional monomers.

Suitable mono-functional monomers include mono-functional acrylates, mono-functional acrylamides, mono-functional vinyl compounds, mono-functional methacrylates, mono-functional allyl ethers, mono-functional maleates, mono-functional fumarates, mono-functional methacrylamides or a mixture thereof.

Suitable monofunctional acrylates include caprolactone acrylate, cyclic trimethylolpropane formal acrylate, ethoxylated nonyl phenol acrylate, isodecyl acrylate, isooctyl acrylate, octyldecyl acrylate, alkoxylated phenol acrylate, tridecyl acrylate, isoamyl acrylate, stearyl acrylate, lauryl acrylate, octyl acrylate, decyl acrylate, isoamylstyl acrylate, isostearyl acrylate, 2-ethylhexyl-diglycol acrylate, 2-hydroxybutyl acrylate, butoxyethyl acrylate, ethoxydiethylene glycol acrylate, methoxydiethylene glycol acrylate, methoxypolyethylene glycol acrylate, methoxypropylene glycol acrylate, phenoxyethyl acrylate, tetrahydrofurfuryl acrylate, isobornyl acrylate, 2-hydroxyethyl acrylate, 2-hydroxypropyl acrylate, 2-hydroxy-3-phenoxypropyl acrylate, 2-acryloyloxyethylsuccinic acid, 2-acryloxyethylphthalic acid, 2-acryloxyethyl-2-hydroxyethyl-phthalic acid, lactone modified flexible acrylate, or t-butylcyclohexyl acrylate.

Suitable mono-functional acrylamides include acryloyl morpholine, N-isopropyl acrylamide, N-tert-butyl acrylamide, diacetone acrylamide.

Suitable mono-functional vinyl compounds include vinyl ethers such as ethyl vinyl ether, n-butyl vinyl ether, iso-butyl vinyl ether, cyclohexyl vinyl ether, 2-ethylhexyl vinyl ether, dodecyl vinyl ether, octadecyl vinyl ether, or hydroxybutyl vinyl ether and vinyl amides such as N-vinyl caprolactam, N-vinyl pyrrolidone, N-methyl-N-vinyl acetamide, prN-vinyl imidazole.

Suitable multi-functional monomers may have two or more functional groups selected from an alkenyl, alkynyl, acrylate, maleate, fumarate or acrylamide functional group.

Suitable multi-functional acrylate monomers include hexanediol diacrylate (e.g. 1,6-hexanediol diacrylate), 3-methyl-1,5-pentanediyl diacrylate, di-trimethylolpropane tetraacrylate, dipentaerythritol pentaacrylate, dipentaerythritol hexaacrylate, ethoxylated pentaeryhtitol tetraacrylate, triethylene glycol diacrylate, tetraethylene glycol diacrylate, polyethylene glycol diacrylate, dipropylene glycol diacrylate, tripropylene glycol diacrylate, polypropylene glycol diacrylate, 1,4-butanediol diacrylate, 1,9-nonanediol diacrylate, neopentyl glycol diacrylate, dimethylol-tricyclodecane diacrylate, bisphenol A EO (ethylene oxide) adduct diacrylate, bisphenol A PO (propylene oxide) adduct diacrylate, hydroxypivalate neopentyl glycol diacrylate, propoxylated neopentyl glycol diacrylate, alkoxylated dimethyloltricyclodecane diacrylate and polytetramethylene glycol diacrylate, trimethylolpropane triacrylate, EO modified trimethylolpropane triacrylate, tri (propylene glycol) triacrylate, caprolactone modified trimethylolpropane triacrylate, pentaerythritol triacrylate, pentaerithritol tetraacrylate, ethoxylated pentaerythritol tetraacrylate, glyceryl propoxy triacrylate, or caprolactam modified dipentaerythritol hexaacrylate.

Suitable multi-functional vinyl monomers include 1,4-butanediol divinyl ether, diethyleneglycol divinyl ether, triethyleneglycol, divinyl ether, polyethyleneglycol divinyl ether, 1,4-cyclohexanedimethanol divinyl ether.

Preferably, the carrier monomer is a multi-functional acrylate monomer such as a difunctional acrylate monomer. The difunctional acrylate monomer may be dipropylene glycol diacrylate. In the case where the carrier monomer is a combination of two or more monomers, each monomer is preferably a multi-functional acrylate monomer such as a difunctional acrylate monomer.

In some cases the carrier monomer is a difunctional acrylate monomer and the dye monomer is a difunctional methacrylate monomer. Preferably, the chromophore moiety of the dye monomer is an anthraquinone.

In this way, the acrylate carrier monomer provides fast curing rates and is compatible with the methacrylate dye monomer. It is proposed that when acrylates and methacrylates are co-polymerised, the polymer tends to be methacrylate-rich due to the energetic preference for the growing chain-end to be methacrylate-terminated. In this way, most of the relatively small amount of the dye monomer (as compared to the amount of the carrier monomer) can be incorporated whilst maintaining fast curing rates.

The amount of carrier monomer in the curable ink composition is 50 wt % or more based on the total weight of the ink composition.

Preferably, the carrier monomer is present at 50 wt % or more based on total weight of the ink composition, preferably 60 wt % or more, and even more preferably 70 wt % or more.

Preferably, the carrier monomer is present at 90 wt % or less based on total weight of the ink composition, more preferably 85 wt % or less and even more preferably 80 wt % or less.

The carrier monomer may be present in an amount that is in a range with the upper and lower limits selected from the amounts described above. For example, the dye monomer may be present at 60 to 80 wt % based on total weight of the ink composition.

Preferably, the carrier monomer has a molecular weight, such as a weight average molecular weight (Mw) greater than 30, more preferably greater than 50 and even more preferably greater than 100.

Preferably, the carrier monomer has a molecular weight, such as a weight average molecular weight (Mw) less than 1000, more preferably less than 500, more preferably less than 400, and even more preferably less than 200.

The carrier monomer may have a molecular weight, such as a weight average molecular weight (Mw) that is in a range with the upper and lower limits selected from the amounts described above. Preferably, the carrier monomer has a molecular weight, such as a weight average molecular weight (Mw) between 30 and 1000, more preferably between 30 and 500, more preferably between 50 and 500, more preferably between 50 and 400 and even more preferably between 100 and 200. In the case where the carrier monomer is a combination of two or more monomers, each monomer preferably has a molecular weight as disclosed above.

Initiators

The curable ink composition comprises an initiator. The initiator may be a thermal initiator of a photoinitiator, preferably the initiator is a photoinitiator.

The term initiator refers to a compound that undergoes a reaction due to an external stimulus producing a reactive species such as a radical. The external stimulus may be UV radiation, thermal radiation, actinic radiation or the use of an electron beam. The reactive species reacts with one or more of the monomers to initiate the polymerization reaction.

The initiator may be a photoinitiator.

The term photoinitiator refers to a compounds that undergoes a photoreaction on absorption of light, producing reactive species such as a radical. The external stimulus may be visible light or UV radiation, preferably the external stimulus is UV radiation. The reactive species produced reacts with one or more of the monomers to initiate the polymerization reaction.

The photoinitiator may provide this function when irradiated with light having a wavelength within the range of 450 to 300 nm (i.e. UV radiation). This may mean that the photoinitiator has light absorption characteristics in the entire wavelength range of 450 to 300 nm.

The photoinitiaotor may be chosen to absorb light at a frequency that the chromophore does not absorb light. For example, phosphine oxides have absorption peak at around 360 to 400 nm. Red anthraquinone chromophores have absorption minima in this range. In this way, the chromophore moiety does not absorb the radiation that is applied to initiate the reaction.

Photoinitiators are well known in the art. The photoinitiator may be selected from benzil ketals, α-hydroxyalkyphenones (such as α-hydroxyacetophenones, for example, difunctional alpha hydroxyl ketone or 2-hydroxy-1-[4-[[4-(2-hydroxy-2-methyl-propanoyl)phenyl]methyl]phenyl]-2-methyl-propan-1-one, discussed below), α-amino acetophenones, phosphine oxides (such as TPO), benzophenones, ketosulphones, thioxanthones, benzoylformate esters or a mixture thereof. Preferably, the photoinitiator is selected from TPO and benzophenone. More preferably, the photoinitiator is a mixture of TPO and benzophenone.

Preferably, the total amount of the photoinitiator is 30 wt % or less based on total weight of the ink composition, more preferably 20 wt % or less and even more preferably 17 wt % or less.

Preferably, the total amount of the photoinitiator is 5 wt % or more based on total weight of the ink composition, preferably 8 wt % or more, and even more preferably 10 wt % or more.

The total amount of the photoinitiator may be an amount that is in a range with the upper and lower limits selected from the amounts described above. For example, the total amount of the photoinitiator is 10 to 20 wt % based on total weight of the ink composition.

Solvents

The inks of the present invention may comprise a solvent such as an organic solvent. In this way, the dye monomer may be fully solubilised in the curable ink composition.

The organic solvent may be selected from dichloromethane (DCM), acetone, methyl ethyl ketone, methyl propyl ketone, methyl isobutyl ketone, cyclohexanone, ethanol, isopropanol, n-propanol, isobutanol, n-butanol, sec-butanol, methyl acetate, ethyl acetate, n-propyl acetate, isopropyl acetate, n-butyl acetate, isobutyl acetate, t-butyl acetate, n-amyl acetate, isoamyl acetate, isobutyl isobutyrate, ethylene glycol, propylene glycol, 1-methoxy-2-propanol and 1-methoxy-2-propyl acetate, dimethyl carbonate, propylene carbonate, dimethyl succinate, dimethyl glutarate, dimethyl adipate, butyl diglycol acetate or a mixture thereof.

In some cases, the solvent may be present in less than 95 wt % based on total weight of the ink composition, more preferably less than 80 wt % and even more preferably less than 60 wt %. Preferably, the solvent is present in greater than 10 wt % based on total weight of the ink composition, preferably greater than 30 wt %, and even more preferably greater than 50 wt %. The solvent may be present in an amount that is in a range with the upper and lower limits selected from the amounts described above. In particular, when the inks of the present invention are for CIJ or TIJ printing, the inks have solvent amounts as described above.

If present, water may be present at 10 wt % or less based on the total weight of the ink composition, and preferably water is present at 5 wt % or less and even more preferably 1 wt % or less based on the total weight of the ink composition.

Preferably inks of the invention are substantially free from volatile organic solvents and water. In particular, when the inks of the invention are for drop on demand inkjet printing such as piezoelectric drop on demand inkjet printing the inks are preferably free from volatile organic solvents and water.

The solvent may be present at less than 20 wt % based on total weight of the ink composition, more preferably less than 10 wt % and even more preferably less than 7 wt %. In some cases, the solvent is present at greater than 1 wt % based on total weight of the ink composition, preferably greater than 3 wt %, and even more preferably greater than 4 wt %. The solvent may be present at an amount that is in a range with the upper and lower limits selected from the amounts described above. In particular, when the inks of the invention are for drop on demand inkjet printing such as piezoelectric drop on demand inkjet printing the inks have solvent amounts as described above.

Amine Functional Materials

The inks of the present invention may further comprise an amine compound.

The inks of the current formulation may have low viscosity, for example, to increase compatibility with drop on demand printers such as piezoelectric drop on demand printer.

Low viscosity formulations are particularly susceptible to oxygen inhibition because the oxygen can diffuse more rapidly into the printed film. The presence of oxygen interferes with the proper propagation of the free radical reactions so that cure may not be complete, particularly on the surface of the ink after exposure to UV light.

It is proposed that, amines provide a source of abstractable hydrogen atoms to quench reactive oxygen species. It is also proposed that amines recycle the peroxy radicals that are formed as a consequence of reaction with oxygen. This means that the radicals are not lost to the system, but are returned, via the amine, in a form that can support further polymerisation.

In this way, the presence of an amine may improve curing performance. It is also proposed that amine compounds, in particular oligomeric amine compounds, contribute positively to the toughness and adhesion of the cured ink film.

The amine compound may be any type of amine containing compound such as a small molecule amine, an amine functional oligomer or an amine functional polymer. The amine may be a primary, secondary or tertiary amine. A primary amine is an amines having one non-hydrogen substituent (i.e. $NRH_2$); a secondary amine is an amide having two non-hydrogen substituents (i.e. NRR'H); a tertiary amine is an amine having three non-hydrogen substituents (i.e. NRR'R"). Preferably, the amine is a secondary or tertiary amine, more preferably a tertiary amine.

Preferably, the amine compound is an amine acrylate or an amine oligomer. In some cases, the amine acrylate is an amine functional acrylate oligomer. Examples of amine functional acrylates include aminated polyether acrylate oligomers (such as Ebecryl 7100 and Ebecryl LEO10552). Examples of amine oligomers include Genomer 5695 and Genomer 5275.

Preferably, the amine compound has a molecular weight, such as a weight average molecular weight (Mw) between 200 and 10,000, more preferably between 200 and 5,000, more preferably between 500 and 5,000, more preferably between 200 and 1,000 and even more preferably between 500 and 1,000.

Preferably, the amine compound is present in less than 25 wt % based on total weight of the ink composition, more preferably less than 15 wt % and even more preferably less than 10 wt %.

Preferably, the amine compound is present in greater than 1 wt % based on total weight of the ink composition, preferably greater than 2 wt %, and even more preferably greater than 5 wt %.

The amine compound may be present in an amount that is in a range with the upper and lower limits selected from the amounts described above.

Further Colourant

The ink composition and the printed deposit may comprise a further colourant. The further colourant is not particularly limited and any suitable colourant known in the art may be used.

The incorporation of a further colourant may provide additional properties to the ink, for example the incorporation of a white further colourant may provide opaque films.

The further colourant may be a dye or a pigment. Preferably the further colourant is a pigment. The pigment may be an inorganic or an organic pigment.

Preferably the pigment has an average particle size of less than 1 µm. The average particle size referred to here is the Z average particle size calculated using dynamic light scattering. This is the intensity weighted mean hydrodynamic size of the collection of particles.

The organic pigments may be selected from azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigment), nitro pigments, nitroso pigments, aniline black and carbon black.

Carbon blacks for use in the ink of the present invention include carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Mogul E, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black FW 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

Pigments for yellow inks include C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment yellow 98, C.I. Pigment Yellow 109, C.I. Pigment Yellow 110, C.I. Pigment Yellow 114, C.I. Pigment Yellow 128, C.I. Pigment Yellow 129, C.I. Pigment yellow 138, C.I. Pigment Yellow 150, C.I. Pigment Yellow 151, C.I. Pigment Yellow 154, C.I. Pigment Yellow 155, C.I. Pigment Yellow 180, C.I. Pigment Yellow 185, and C.I. Pigment Yellow 139.

Pigments for orange inks include C.I. Pigment Orange 64, and C.I. Pigment Orange 73. Pigments for magenta inks include C.I. Pigment Red 5, C.I. Pigment Red 7, C.I. Pigment Red 12, C.I. Pigment Red 48 (Ca), C.I. Pigment Red 48 8 (Mn), C.I. Pigment Red 57 (Ca), C.I. Pigment Red 57: 1, C.I. pigment Red 112, C.I. Pigment Red 122, C.I. Pigment Red 123, C.I. Pigment Red 168, C.I. Pigment Red 184, C.I. Pigment Red 202, C.I. Pigment Red 176, C.I. Pigment Red 254, C.I. Pigment Red 255, C.I. Pigment Red 272, C.I. Pigment Red 254, C.I Pigment Violet 19.

Pigments for cyan inks include C.I. Pigment Blue 1, C.I. Pigment Blue 2, C.I. Pigment Blue 3, C.I. Pigment Blue 15: 2, C.I. Pigment Blue 15:3, C.I. Pigment Blue 15:4, C.I. Pigment Blue 15: 34, C.I. Pigment Blue 16, C.I. Pigment Blue 22, C.I. Pigment Blue 60, C.I. Vat Blue 4, C.I. Vat Blue 60

Pigments for green inks include C.I. Pigment Green 3 and 0.1 Pigment Green 7.

Pigments for violet inks include C.I. Pigment Violet 23 and C.I. Pigment Violet 37.

Pigments for white inks include C.I. Pigment White 6.

Preferably, the organic pigment is selected from C.I. Pigment Yellow 83, C.I. Pigment Yellow 138, C.I. Pigment Yellow 139, C.I. Pigment Yellow 150, C.I. Pigment Yellow 151, Pigment Yellow 154, C.I. Pigment Yellow 155, C.I. Pigment Yellow 185, C.I. Pigment Orange 43, Pigment Orange 64, C.I. Pigment Orange 73, C.I. Pigment Red 122, C.I. Pigment Red 176, C.I. Pigment Red 254, C.I. Pigment Red 255, C.I. Pigment Red 272, C.I. Pigment Blue 15:3, C.I. Pigment Blue 15:4, C.I. Pigment Green 7, C.I. Pigment Violet 19, C.I. Pigment Violet 23, Pigment Black 7, and carbon black.

When the further colourant is a pigment, the pigment may be in the form of a dispersion in the composition. The pigment dispersion may comprise a dispersant or one or more of the monomer components that is present in the ink.

The further colorant may be an oil or solvent soluble dye.

Examples of yellow dyes include aryl or heteryl azo dyes having a coupling component such as a phenol, a naphthol, an aniline, a pyrazolone, a pyridone, or an open-chain active methylene compound; azomethine dyes having a coupling component such as an open-chain active methylene compound; methine dyes such as benzylidene dyes and monomethineoxonol dyes; quinone dyes such as naphthoquinone dyes and anthraquinone dyes; and other dye species such as quinophthalone dyes, nitro/nitroso dyes, acridine dyes, and acridinone dyes.

Examples of magenta dyes include aryl or heteryl azo dyes having a coupling component such as a phenol, a naphthol, or an aniline; azomethine dyes having a coupling component such as a pyrazolone or a pyrazolotriazole; methine dyes such as arylidene dyes, styryl dyes, merocyanine dyes, and oxonol dyes; carbonium dyes such as diphenylmethane dyes, triphenylmethane dyes, and xanthene dyes; quinone dyes such as naphthoquinones, anthraquinones, or anthrapyridones; and condensed polycyclic dyes such as dioxazine dyes.

Examples of cyan dyes include indoaniline dyes, indophenol dyes, and azomethine dyes having a coupling component such as a pyrrolotriazole; polymethine dyes such as cyanine dyes, oxonol dyes, and merocyanine dyes; carbonium dyes such as diphenylmethane dyes, triphenylmethane dyes, and xanthene dyes; phthalocyanine dyes; anthraquinone dyes; aryl or heteryl azo dyes having a coupling component such as a phenol, a naphthol, or an aniline; and indigo/thioindigo dyes.

Preferably the further colourant is present in between 1 to 25 wt % based on total weight of the ink composition, more preferably 1.5 to 15 wt %, and most preferably 2 to 8 wt % based on total weight of the ink composition.

Preferably, the further colourant is present in less than 25 wt % based on total weight of the ink composition, more preferably less than 15 wt % and even more preferably less than 10 wt %.

Preferably, the further colourant is present in greater than 1 wt % based on total weight of the ink composition, preferably greater than 1.5 wt %, and even more preferably greater than 2 wt %.

The further colourant may be present in an amount that is in a range with the upper and lower limits selected from the amounts described above.

Oligomers

The curable ink composition of the invention may further comprise an oligomer.

In some cases the oligomer is polymerizable. That is, the oligomer contains functional groups that can undergo polymerization. Preferably, the oligomer is UV curable.

In this way, the cure of the ink may be improved.

Suitable UV curable oligomers for use in the inks of the invention include urethane acrylates, polyester acrylates, polyether acrylates, epoxy acrylates and acrylic acrylates. Preferably, the oligomer is a polyether acrylate such as an aminated polyether acrylate (e.g. Ebecryl Leo 10552). In the case of animated polyether acrylates the same compounds provides both an oligomer and an amine compound to the ink composition.

Preferably, the oligomer has a molecular weight, such as a weight average molecular weight (Mw), of 200 to 50,000, more preferably 300 to 5,000, more preferably 500 to 3,000 and even more preferably 500 to 2,000.

Preferably, the oligomer is present in less than 25 wt % based on total weight of the ink composition, more preferably less than 15 wt % and even more preferably less than 10 wt %.

Preferably, the oligomer is present in greater than 1 wt % based on total weight of the ink composition, preferably greater than 2 wt %, and even more preferably greater than 5 wt %.

The oligomer may be present in an amount that is in a range with the upper and lower limits selected from the amounts described above.

Methods and Uses

The present disclosure provides a method for printing markings on a substrate. The curable ink compositions of the invention may be printed using an inkjet printer, the method comprising the steps of directing a stream of droplets of the ink composition to a substrate and curing the printed ink composition for example by treating the printed ink composition to UV radiation.

The ink compositions are formulated by combining the components using methods known in the art.

The curing process may be carried out by the application of thermal radiation, actinic radiation, by the use of an electron beam or by treating the printed ink composition to UV radiation. Preferably the curing process is carried out by treating the printed ink composition to UV radiation.

The inkjet printer may be a thermal inkjet printer (i.e. a TIJ printer), a continuous inkjet printer (i.e. a CIJ printer) or a drop on demand inkjet printer (i.e. a DOD printer).

Preferably, the inkjet printer is a drop on demand inkjet printer, such as a piezo electric drop on demand inkjet printer. In some preferable cases the inks are applied to the substrate using a high resolution drop on demand printer capable of emitting a range of droplet sizes below 20 pl volume.

Once applied to the substrate, the inks of the current invention are cured. The curing process promotes the polymerization of the monomers in the ink composition to provide a printed deposit. The curing process is initiated by the initiator.

The curing process may be a UV curing process. In such cases, the initiator is a photoinitiator. The UV curing process may comprise a single application of UV radiation or multiple applications of UV radiation. In some cases, the UV curing process comprises two applications of UV radiation.

In some cases, the first (or only) application of UV radiation is provided by an LED. The LED preferably emits within the range 365 nm and 405 nm.

Preferably, the first application of UV radiation provides a dose of 395 nm light delivered at from 20 to 500 mJ/cm$^2$, and more preferably at from 50 to 200 mJ/cm$^2$ (measured as UVA2 using an EIT Power Puck).

Preferably, the first application of UV radiation occurs immediately after printing, for example using an LED positioned immediately adjacent to the print head. In this way, the ink is at least partially cured immediately after printing and further spreading of the ink across the substrate is prevented.

In some cases, the first application of UV radiation is sufficient to cure the ink.

In other cases, additional applications of UV radiation are required. This is particularly the case at high printing speeds for example print speed print speeds up to 50 m/min, more preferably 75 m/min. In these cases, the additional application of UV radiation is preferably provided by a mercury arc source. For the additional application of UV radiation the dose of UVA is preferably from 30 to 1000 mJ/cm$^2$ and more preferably from 50 to 300 mJ/cm$^{2+}$ (measured with an EIT Power Map).

In a further embodiment, printing is carried out using a multi-pass inkjet printer. In this case, a UV light source, preferably an LED, is mounted on the printhead carriage. In this way, the UV light may be applied after each successive row of printing.

Substrate

The present disclosure provides a method for printing markings on a substrate. Any suitable substrate may be printed in accordance with the invention.

Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, polymer laminates, metals, metal foil laminates, glass, and ceramics. The paper substrates may be thin sheets of paper, rolls of paper, or cardboard. Plastics, laminates, metals, glass, and ceramic substrates may be in any suitable form such as in the form of bottles or containers, plates, rods, cylinders, etc.

The curable ink composition of the present invention is particularly suitable for printing on non-porous material, for example, non-porous materials used for food packaging.

In many cases the substrate will be a plastic film, paper or paperboard.

Suitable examples of plastic films include films comprising polyethylene, polypropylene, polyester, polyamide, PVC, polylactic acid, or cellulosic films. The plastic film may be pretreated or coated, for example to improve the adhesion of the inks or to render it more suitable for the application in question.

Metallic films such as those used for lidding applications, glass and ceramics may also be printed.

Advantageously, using the compositions and methods described herein overcomes and/or mitigates at least some of the problems described above, providing an improved quality print.

Additives

The curable ink composition and/or the printed deposit may contain additional components, such as are common in the art (see for example EP2070998 and EP1788045).

The ink composition and/or the printed deposit may further comprise one or more stabilisers (e.g. photostabilizers), preservatives (e.g. antioxidants, anti-aging agents), humectants, surfactants, conductivity salts, wetting agents, surface treatment agents, adhesion promotion additives, dispersants, tackifiers, biocides, antiseptics, crosslinking promoters, polymerization inhibitors, plasticizers, pH adjusters, anti-foaming agents, and mixtures of two or more thereof. Preferably, the ink composition further comprises one or more stabilisers (e.g. photostabilizers), conductivity salts or wetting agents.

Stabilisers

Preferably, the ink composition and/or the printed deposit further comprises a stabiliser.

It is proposed that, in some cases the jetting performance of an inkjet ink is dependent on its viscosity. Undesired free radical polymerisation, for example of the acrylate or vinyl ether groups, can lead to a viscosity increase. A stabiliser may be used to prevent undesired free radical polymerisation, for example the stabiliser may acts as a polymerisation inhibitor to avoid even low levels of free radical polymerisation in the ink during storage or before use.

Suitable stabilisers include p-methoxy phenol (MEHQ), butylated hydroxy toluene (BHT), quinone methide, cupferron-Al, and TEMPO.

Preferably, a stabiliser is present at from 0.1 to 5 wt % based on total weight of the ink composition.

Conductivity Additives

For continuous inkjet applications the ink composition and/or the printed deposit may further comprise a conductivity additive. The conductivity additive may be any organic salt known in the art.

Conductivity additives for ink compositions are well-known in the art.

Preferably, the organic salt is selected from quaternary ammonium or phosphonium salts. For example, the organic salt may be selected from tetraethylammonium chloride, tetraethylammonium bromide, tetrabutylammonium chloride, tetrabutylammonium bromide, tetrabutylammonium acetate, tetrabutylammonium nitrate, tetrabutylammonium tetrafluoroborate, tetrabutylammonium hexafluorophosphate, tetrabutylphosphonium chloride and tetrabutylphosphonium bromide.

Preferably, a conductivity additive is present at from 0.1 to 5 wt % based on total weight of the ink composition.

Wetting Agents

The ink composition and/or the printed deposit may further comprise a wetting agent.

Wetting agents for ink compositions are well-known in the art. The wetting agent may be a silicone based wetting agent, for example a silicone polyether acrylate wetting agent such as TEGO Rad 2300.

Preferably, a wetting agent is present at from 0.1 to 5 wt % based on total weight of the ink composition, more preferably at from 1 to 2 wt % based on the total weight of the ink composition.

Humectants

The ink composition and/or the printed deposit may further comprise a humectant.

Suitable humectants include ethylene glycol, 1,3-propanediol, 1,4-butanediol, 1,4-cyclohexanedimethanol, 1,5-pentanediol, 1,6-hexanediol, 1,8-octanediol, 1,2-propanediol, 1,2-butanediol, 1,3-butanediol, 2,3-butanediol, diethylene glycol, triethylene glycol, tetraethylene glycol, polyethylene glycol, dipropylene glycol, polypropylene glycol, glycerol, 1,2,6-hexanetriol, sorbitol, 2-pyrrolidone, 2-propanediol, butyrolacetone, tetrahydrofurfuryl alcohol and 1,2,4-butanetriol and mixtures of two or more thereof.

The ink composition may comprise approximately a 1:1 ratio of humectant to solvent.

The ink composition may comprise up to 30 wt % of humectants in total based on the total weight of the composition. More preferably, the ink composition comprises up to 20 wt % of humectants in total based on the total weight of the composition.

Preservatives

The ink composition and/or the printed deposit may further comprise a preservative. The preservative may be an antioxidant or an anti-aging agent.

Suitable preservatives include sodium benzoate, benzoic acid, sorbic acid, potassium sorbate, calcium sorbate, calcium benzoate, methylparaben and mixtures of two or more thereof.

The ink composition may comprise up to 2 wt % of preservative based on the total weight of the composition. More preferably, the ink composition comprises up to 1 wt % of preservative based on the total weight of the composition.

Surfactants

The ink composition and/or the printed deposit may further comprise a surfactant.

Suitable surfactants include anionic, cationic or non-ionic surfactants and mixtures of two or more thereof. Non-limiting examples of anionic surfactants include alkyl sulphate, alkylaryl sulfonate, dialkyl sulfonate, dialkyl sulphosuccinate, alkyl phosphate and polyoxyethylene alkyl ether sulphate. Non-limiting examples of cationic surfactants include alkylamine salt, ammonium salt, alkylpyridinium salt and alkylimidazolium salt. Non-limiting examples of non-ionic surfactants include polyoxyethylene alkyl ether, polyoxyethylene alkylaryl ether, sorbitan fatty acid ester, polyoxyethylene sorbitan fatty acid ester, polyoxyethylene sorbitol fatty acid ester, glycerine fatty acid ester, a fluorine-containing non-ionic surfactant and a silicon-containing non-ionic surfactant. Mixtures of two or more surfactants may be used.

The ink composition may comprise up to 5 wt % of surfactant based on the total weight of the composition. More preferably, the ink composition comprises up to 1 wt % of surfactant based on the total weight of the composition.

Tackifier

The ink composition and the printed deposit may further comprise a tackifier.

In some cases the tackifier may be a binder; preferably, when the tackifier is a binder it is used in combination with a co-binder. In some cases, the tackifier is a non-film forming polymer. In some cases, the tackifier may be used in combination with other polymers to produce the desired properties.

Suitable tackifiers include resins such as rosins, terpenes and modified terpenes, aliphatic, cycloaliphatic and aromatic resins, terpene phenolic resins and silicone or mineral oils. Preferably the tackifiers are a terpene phenolic resin and/or an ester of hydrogenated rosin.

The ink composition may comprise from 0.3 to 10 wt % of tackifier based on the total weight of the composition. More preferably, the ink composition comprises from 1 to 5 wt % of tackifier based on the total weight of the composition.

Adhesion Promoter

The ink composition and the printed deposit may further comprise an adhesion promoter.

An adhesion promotor is a substance which acts to promote adhesion of the ink composition to a substrate.

Suitable adhesion promotors are titanium phosphate complex, titanium acetylacetonate, triethanolamine zirconate, zirconium citrate, zirconium propanoate, organosilicon, polyketones binders, polyesters binders, or a ketone condensation resin.

Dispersant

The ink composition and the printed deposit may further comprise a pigment dispersant.

A dispersant is a substance which promotes dispersion of a component of the ink composition, for examples promotes dispersion of a pigment.

Suitable dispersants include ionic and non-ionic dispersants. Preferably the dispersant is an acrylic block co-copolymer.

The dispersant may be pre-mixed with the colourant for example the pigment.

The dispersant may be selected according to the nature of the colourant. The amount of dispersant is preferably from 2 wt % to 200 wt % based on the weight of pigment in the ink composition.

Definitions

As used herein the term printed deposit refers to the ink composition after it has been printed onto a suitable substrate and cured. That is the ink composition of the present invention wherein at least some of the monomers present in the ink composition are polymerized to form a film.

As used herein the term ink composition includes an ink composition suitable for use in any kind of printing, for example in inkjet printing. The ink composition is typically in the form of a liquid.

As used herein the term polymer refers to any substance having a repeat unit.

Other Preferences

Each and every compatible combination of the embodiments described above is explicitly disclosed herein, as if each and every combination was individually and explicitly recited.

Various further aspects and embodiments of the present invention will be apparent to those skilled in the art in view of the present disclosure.

"and/or" where used herein is to be taken as specific disclosure of each of the two specified features or components with or without the other. For example "A and/or B" is to be taken as specific disclosure of each of (i) A, (ii) B and (iii) A and B, just as if each is set out individually herein.

Unless context dictates otherwise, the descriptions and definitions of the features set out above are not limited to any particular aspect or embodiment of the invention and apply equally to all aspects and embodiments which are described.

Certain aspects and embodiments of the invention will now be illustrated by way of example and with reference to the figures described above.

REFERENCES

Fleischmann, C.; Lievenbrück, M.; Ritter, H. *Polymers (Basel)*. 2015, 7 (4), 717.
Dollendorf, C.; Kreth, S. K.; Choi, S. W.; Ritter, H. *Beilstein J. Org. Chem.* 2013, 9 (1), 453.
Afsharnia, A.; Zabarjad, S. N.; Baradaran, R. S.; Bayat, M.; et al. *J. Appl. Chem. Res.* 2011, 18 (0), 13.
McCurdy, K. G.; Laidler, K. *J. Can. J. Chem.* 1964, 42 (4), 825.
U.S. Pat. No. 7,030,244
U.S. Pat. No. 6,870,063

Examples

The following non-limiting examples further illustrate the present invention.

All commercial chemicals were used as bought from the suppliers unless otherwise stated.

1-chloroanthraquinone, 1,5-anthraquinone, and 1,8-anthraquinone were purchased from Tokyo Chemical Industry.

Propanolamine and methacryloyl chloride were purchased from Sigma-Aldrich.

All solvents were purchased from Fisher Scientific.

UV-vis spectroscopy was carried out using a Shimadzu UV-1800 spectrophotometer, using the appropriate solvent as a reference.

FT-IR spectroscopy was carried out using a ThermoScientific Nicolet iS10 spectrophotometer using a SMART iTX attachment.

NMR spectra were obtained using a 500 MHz DCH Cryoprobe Spectrometer.

Viscosity of solutions were measured using a Brookfield DV-E viscometer, at 25° C. and with a spindle speed of 60 rpm.

Colour space measurements were taken using an X-Rite eXact NGH spectrophotometer.

Curing of acrylate/methacrylate films was carried out by placing the uncured samples on a 2 m slide underneath a Baldwin iron-doped mercury arc lamp (model CA300) and a Phoseon 20 W/cm$^2$ LED lamp at 395 nm (model FP300 225X20WC395). Standard curing conditions used were 60% Arc lamp and 50% LED, with the slide passing under the lamps once at a speed of 50 m/min. These curing conditions deliver a UVA dose of about 175 mJ/cm$^2$.

Ageing studies were carried out using a Bandol Wheel (Unitronics Vision 120) at 50° C. for the times indicated in the text.

Example 1—Synthesis of Methacrylated Anthraquinone Compounds

Five different methacrylated anthraquinones were synthesised, starting from commercially-available chloroanthraquinones. The reaction scheme for these syntheses is shown in FIG. 1. In each case, the starting chloroanthraquinone reacted with a suitably functionalised amine to produce the hydroxylated compounds 1 to 5. The hydroxyl groups were subsequently functionalised with methacryloyl chloride to give compounds 1a-5a. The structures of these were confirmed by $^1$H NMR, as detailed in the experimental section.

Figure 2:
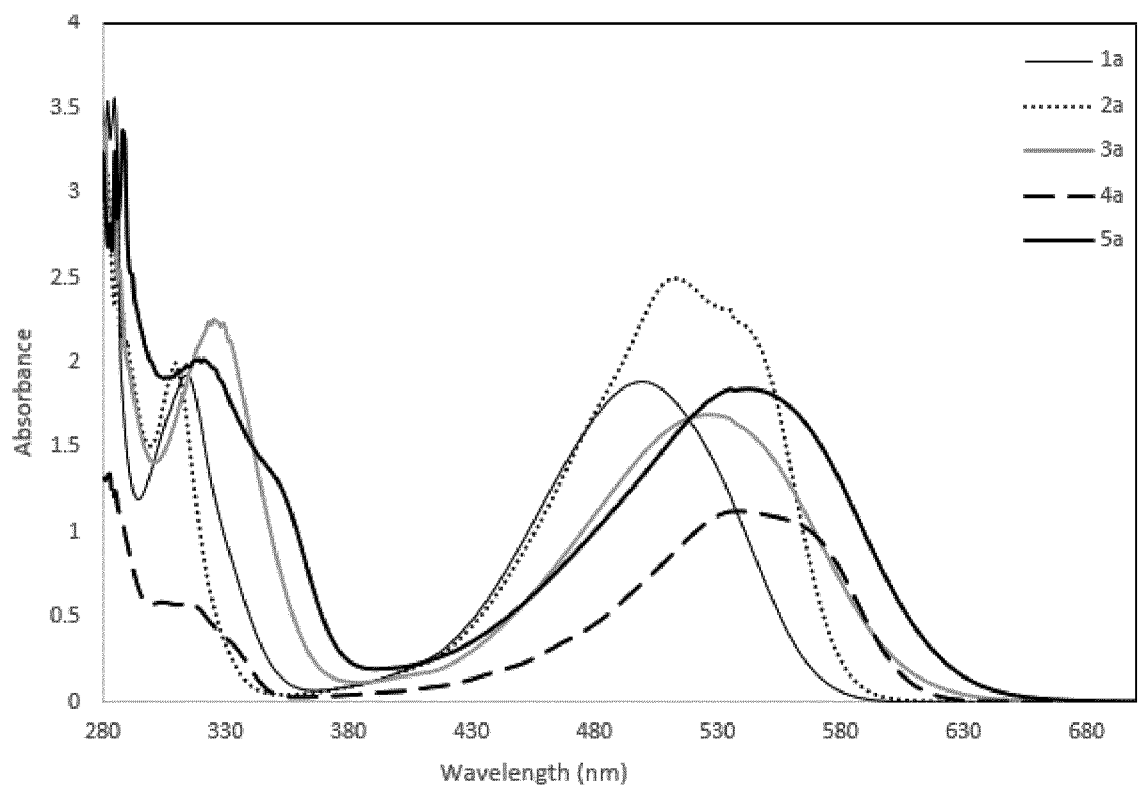
FIG. 2 shows a UV-vis spectra of solutions of 1a-5a, dissolved at 0.01% w/w in THF.
Figure 3:
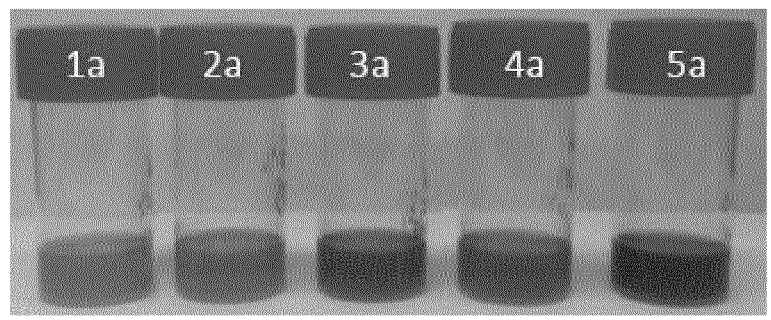
FIG. 3 is a photographs of solutions of compounds 1a-5a, dissolved in THF at 0.01% w/w.

The UV-vis spectra of compounds 1a to 5a in solution are shown in FIG. 2. The overall form of the spectrum is similar for each compound; subtle differences in the width and λmax of the strongest absorption give rise to variations in the colour of the materials, as shown in FIG. 3.

Synthesis of 1-[(3-hydroxypropyl)amino]anthracene-9,10-dione, 1

1-chloroanthraquinone (1 g, 4.1 mmol) was dissolved with propanolamine (12.4 mmol, 0.93 g) in 15 ml NMP at 150° C. under a nitrogen atmosphere for 48 h, forming a red solution. The reaction mixture was cooled to room temperature then taken up into water to precipitate the product, which was separated by filtration and recrystallised from acetonitrile. Yield: 0.95 g. 1H NMR (500 MHz, d6-DMSO, δ): 9.7 (t, J=6 Hz, 1H; NH), 8.2 (dd, J=8 Hz, 2 Hz, 1H, Ar H), 8.1 (dd, J=8 Hz, 2 Hz, 1H, Ar H), 7.9 (ddd, J=8 Hz, 8 Hz, 2 Hz, 1H, Ar H), 7.8 (ddd, J=7.8 Hz, 7.8 Hz, 2 Hz, 1H, Ar H), 7.6 (dd, J=7.3 Hz, 9 Hz, 1H, Ar H), 7.4 (dd, J=7 Hz, 1 Hz, 1H, Ar H), 7.3 (dd, J=9 Hz, 1 Hz, 1H, Ar H), 4.6 (t, J=5 Hz, 1H, OH), 3.6 (dt, J=5 Hz, 6 Hz, 2H, CH$_2$), 3.4 (td, J=7 Hz, 6 Hz, 2H, CH$_2$), 1.8 (tt, J=6 Hz, 7 Hz, 2H, CH$_2$). IR(ATR):): v=3340 (br), 3271 (s), 2930, 2866, 1662, 1626, 1592, 1571, 1510

Synthesis of 3-[(9,10-dioxoanthracen-1-yl)amino] propyl 2-methylprop-2-enoate, 1a 1-[(3-hydroxypropyl)amino]anthracene-9,10-dione (1 g, 2.9 mmol) was dissolved in 20 ml THF with triethylamine (1 ml, 7.5 mmol). The reaction mixture was cooled to 0° C. under nitrogen, and methacryloyl chloride (1 ml, 10.4 mmol) was added dropwise over 30 min. The mixture was stirred for 1 h at 0° C. and then at room temperature for 18 h. Once the reaction was complete by tlc (eluent: diethyl ether), the reaction mixture was taken up into water to precipitate the red product, which was separated by filtration and then recrystallised from acetonitrile. Yield: 0.87 g of a red solid. 1H NMR (500 MHz, CDCl$_3$, δ): 9.8 (t, J=5.7 Hz, 1H, NH), 8.3 (dd, J=7.7, 1.6 Hz, 1H, Ar H), 8.2 (dd, J=7.7, 1.6 Hz, 1H, Ar H), 7.8 (ddd, J=7.5, 7.5, 1.5 Hz, 1H, Ar H), 7.7 (ddd, J=7.6, 7.6, 1.5 Hz, 1H, Ar H), 7.6 (dd, J=7.3, 1.4

Hz, 1H, Ar H), 7.5 (dd, J=8.5, 7.3 Hz, 1H, Ar H), 7.0 (dd, J=8.6, 1.3 Hz, 1H, Ar H), 6.1 (dq, J=2, 0.9 Hz, 1H, C=CH), 5.6 (dq, J=1.8, 1.8 Hz, 1H, C=CH), 4.3 (t, J=6.2 Hz, 2H, CH$_2$), 3.5 (dt, J=5.6, 7.1 Hz, 2H, CH$_2$), 2.2 (tt, J=6.4, 7.0 Hz, 2H, CH$_2$), 1.9 (dd, J=1.7, 0.9 Hz, 3H, CH$_3$). UV-vis (THF): λ$_{max}$=501 nm. IR(ATR): 3270, 2881, 1717 (s), 1661, 1628, 1592, 1573, 1507

Synthesis of 1,5-bis[(3-hydroxypropyl)amino]anthracene-9,10-dione, 2

1,5-dichloroanthraquinone (5 g, 18 mmol) was dissolved in 100 ml NMP, and propanolamine (8.3 ml, 108 mmol) and dibasic sodium phosphate (10.25 g, 72 mmol) were added. The mixture was heated to 150° C. for 48 h under nitrogen, before being cooled to room temperature. The reaction mixture was taken up into water to precipitate the product, which was separated by filtration. The product was re-dissolved in a small amount of DMSO and precipitated by addition of water, then separated by filtration and washed with a small quantity of methanol. Yield: 4.2 g. 1H NMR (500 MHz, d6-DMSO, δ): 9.7 (t, J=5.8, 2H, NH), 7.6 (dd, J=7.6, 8.0, 2H, Ar H), 7.4 (dd, J=7.5, 1.2, 2H, Ar H), 7.1 (dd, J=8.8, 1.0, 2H, Ar H), 4.6 (s, 2H, OH), 3.6 (t, J=6.8, 4H, CH$_2$), 3.4 (dt, J=5.9, 6.9, 4H, CH$_2$), 1.8 (tt, J=6.5, 6.7, 4H, CH$_2$). IR(ATR): 3355 (br), 3266, 2925, 2867, 1668, 1617, 1597, 1569, 1504

Synthesis of 3-{[5-({3-[(2-methylprop-2-enoyl)oxy]propyl}amino)-9,10-dioxoanthracen-1-yl]amino}propyl 2-methylprop-2-enoate, 2a 1,5-bis[(3-hydroxypropyl)amino]anthracene-9,10-dione (1 g, 2.8 mmol) was dissolved in 8 ml DMF. TEA (2 ml, 15 mmol) was added and the reaction mixture cooled to 0° C. under nitrogen. Methacryloyl chloride (1.1 ml, 11.3 mmol) was added dropwise over 30 min; the mixture was stirred at 0° C. for 30 min and then at room temperature overnight. 50 ml of water was added, and the product was extracted into dichloromethane. The organic layer was washed twice with brine and then dried over MgSO$_4$; volatiles were then removed under reduced pressure and the product recrystallised from acetonitrile. Yield: 1.03 g. 1H NMR (500 MHz, CDCl$_3$, δ): 9.8 (t, J=6 Hz, 2H, NH), 7.5 (m, 4H, Ar H), 6.9 (dd, J=8.5, 1.7 Hz, 2H, Ar H), 6.1 (dq, J=1.9, 0.9 Hz, 2H, C=CH), 5.6 (dq, J=1.7, 3 Hz, 2H, C=CH), 4.3 (t, J=6.2 Hz, 4H, CH$_2$), 3.4 (dt, J=5.8, 7.3 Hz, 4H, CH$_2$), 2.1 (tt, J=6.5, 6.7 Hz, 4H, CH$_2$), 1.9 (m, 6H, CHs) UV-vis (THF): λ$_{max}$=513 nm IR(ATR): 3275, 2872, 1707, 1619, 1598, 1570, 1503

Synthesis of 1,5-bis[(4-hydroxyphenyl)amino]-4a,9a-dihydroanthracene-9,10-dione, 3

1,5-dichloroanthraquinone (5 g, 18 mmol) was dissolved in NMP under nitrogen. 4-hydroxyaniline (11.8 g, 108 mmol) and dibasic sodium phosphate (10.25 g, 72 mmol) were added and the mixture was heated to 150° C. overnight. Once the reaction was complete, the mixture was poured into water to precipitate the product, which was separated by filtration and recrystallised from MEK. Yield: 4.8 g of a purple solid. 1H NMR (500 MHz, d6-DMSO, δ): 11.1 (s, 2H, NH), 9.5 (s, 2H, OH), 7.55 (m, 4H, Ar H), 7.2 (dd, J=8.2, 1.8 Hz, 2H, Ar H), 7.15 (d, J=9.2 Hz, 4H, Ar H), 6.8 (d, J=8.8 Hz, 4H, Ar H) IR(ATR): v=3120 (br), 3078 (s), 2805 (w). 1617 (w), 1588.9 (str), 1512 (s)

Synthesis of 4-{[5-({4-[(2-methylprop-2-enoyl)oxy]phenyl}amino)-9,10-dioxoanthracen-1-yl]amino}phenyl 2-methylprop-2-enoate, 3a 1,5-bis[(4-hydroxyphenyl)amino]-4a,9a-dihydroanthracene-9,10-dione (1 g, 2.4 mmol) was dissolved in THF under nitrogen. TEA (2 ml, 15 mmol) was added and the mixture cooled to 0° C. under nitrogen. Methacryloyl chloride (1 ml, 10.3 mmol) was added dropwise and the mixture stirred at 0° C. for 1 h then at room temperature overnight. The mixture was then poured into water to precipitate a purple solid, which was recrystallised from methanol. Yield: 0.97 g. 1H NMR (500 MHz, CDCl$_3$, δ): 11.3 (s, 2H, NH), 7.7 (dd, J=7.4, 1.3 Hz, 2H, Ar H), 7.5 (dd, J=7.5, 8.8 Hz, 2H, Ar H), 7.4 (dd, J=8.8, 1.4 Hz, 2H, Ar H), 7.3 (d, J=9.1 Hz, 4H, Ar H), 7.2 (d, J=8.9 Hz, 4H, Ar H), 6.4 (m, 2H, C=CH), 5.8 (m, 2H, C=CH), 2.1 (m, 6H, CHs) UV-vis (THF): λ$_{max}$=523 nm IR(ATR): v=3067, 2980, 1733, 1695, 1627

Synthesis of 1,8-bis[(3-hydroxypropyl)amino]anthracene-9,10-dione, 4

1,8-dichloroanthraquinone (5 g, 18 mmol) was dissolved in 100 ml NMP, and propanolamine (8.3 ml, 108 mmol) and dibasic sodium phosphate (10.25 g, 72 mmol) were added. The mixture was heated to 150° C. for 48 h under nitrogen, before being cooled to room temperature. The reaction mixture was taken up into water to precipitate the product, which was separated by filtration. The product was purified by column chromatography (silica gel, eluant 1:1 diethyl ether: petroleum ether), yielding 3.8 g of a deep purple solid. 1H NMR (500 MHz, d6-DMSO, δ): 9.5 (t, J=6.5 Hz, 2H, NH), 7.5 (dd, J=9, 7.6 Hz, 2H, Ar H), 7.3 (dd, J=7.4, 1.2 Hz, 2H, Ar H), 7.2 (dd, J=8.9, 1.0 Hz, 2H, Ar H), 4.6 (t, J=5.5 Hz, 2H, OH), 3.6 (dt, J=5.6, 5.4 Hz, 4H, CH$_2$), 3.4 (dt, J=6.4, 5.8 Hz, 4H, CH$_2$), 1.8 (tt, J=6.6, 7.0 Hz, 4H, CH$_2$). IR(ATR): v=3506, 3310 (br), 3261, 2925, 2851, 1650 (s), 1613, 1564, 1503

Synthesis of 3-{[8-({3-[(2-methylprop-2-enoyl)oxy]propyl}amino)-9,10-dioxoanthracen-1-yl]amino}propyl 2-methylprop-2-enoate, 4a 1,8-bis[(3-hydroxypropyl)amino]anthracene-9,10-dione (1 g, 2.8 mmol) was dissolved in 8 ml DMF, with triethylamine (2 ml, 15 mmol). The reaction mixture was cooled to 0° C. under nitrogen, and methacryloyl chloride (1 ml, 10.4 mmol) was added dropwise over 30 min. The mixture was stirred for 1 h at 0° C. and then at room temperature for 2 h. The reaction mixture was taken up into water to precipitate the product, which was separated by filtration. Yield: 1.2 g of a magenta purple solid. 1H NMR (500 MHz, CDCl$_3$, δ): 9.6 (t, J=5.9 Hz, 2H, NH), 7.5 (dd, J=7.3, 1.2 Hz, 2H, Ar H), 7.4 (dd, J=8.8, 7.6 Hz, 2H, Ar H), 7.0 (dd, J=8.8, 1.3 Hz, 2H, Ar H), 6.1 (m, 2H, C=CH), 5.6 (m, 2H, C=CH), 4.3 (t, J=6.5 Hz, 4H, CH$_2$), 3.5 (dt, J=7.3, 5.6 Hz, 4H, CH$_2$), 2.2 (tt, J=6.9, 7.0 Hz, 4H, CH$_2$), 2.0 (m, 6H, CH$_3$) UV-vis (THF): λ$_{max}$=542 nm IR(ATR): v=3273, 2952, 1710, 1656, 1615, 1567

Synthesis of 1,8-bis[(4-hydroxyphenyl)amino]anthracene-9,10-dione, 5

1,8-dichloroanthraquinone (5 g, 18 mmol) was dissolved in DMSO with dibasic sodium phosphate (10.25 g, 72 mmol) and 4-hydroxyaniline (11.8 g, 108 mmol). The mixture was heated to 150° C. for 48 h, before being allowed to cool and poured into water to precipitate the product. The product was purified by column chromatography (silica gel, eluent 1:1 petroleum ether:diethyl ether). Yield: 5.1 g of a purple solid. 1H NMR (500 MHz, d6-DMSO, δ): 10.9 (s, 2H, NH), 9.5 (s, 2H, OH), 7.5 (dd, J=7.5, 8.4, 2H, Ar H), 7.4 (dd, J=7.4, 1.6, 2H, Ar H), 7.2 (dd, J=8.5, 1.5, 2H, Ar H), 7.1

(d, J=9.2 Hz, 4H, Ar H), 6.8 (d, J=9.2 Hz, 4H, Ar H) IR(ATR): v=3233 (br), 1649, 1617, 1599, 1562, 1511

Synthesis of 4-{[8-({4-[(2-methylprop-2-enoyl)oxy]phenyl}amino)-9,10-dioxoanthracen-1-yl]amino}phenyl 2-methylprop-2-enoate, 5a 1,8-bis[(4-hydroxyphenyl)amino]anthracene-9,10-dione (1 g, 2.4 mmol) was dissolved in 8 ml DMF. TEA (2 ml, 15 mmol) was added and the mixture cooled to 0° C. under nitrogen. Methacryloyl chloride (1 ml, 10.3 mmol) was added dropwise over 30 min and the mixture stirred for 30 min at 0° C., then overnight at room temperature. The mixture was then taken up into water to precipitate the product, which was separated by filtration and recrystallised from methanol. 1H NMR (500 MHz, CDCl$_3$, δ): 11.2 (s, 2H, NH), 7.7 (dd, J=7.0, 1.9 Hz, 2H, Ar H), 7.5 (dd, J=8.9, 1.9 Hz, 2H, Ar H), 7.4 (dd, J=6.9, 8.9 Hz, 2H, Ar H), 7.3 (d, J=9.3 Hz, 4H, Ar H), 7.2 (d, J=9 Hz, 4H, Ar H), 6.4 (m, 2H, C=CH), 5.8 (m, 2H, C=CH), 2.0 (m, 6H, CH$_3$). UV-vis (THF): λ$_{max}$=544 nm IR(ATR): v=3217, 2928, 1732, 1616, 1598, 1569, 1508

Example 2—Incorporation into Crosslinked Films

The methacrylate-functionalised dye compounds 1a to 5a were dissolved in a carrier monomer and optionally a further solvent.

Dipropylene Glycol Diacrylate (DPGDA) was used for the carrier monomer.

A stock solution was formed from DPGDA, containing 2,4,6-trimethylbenzoyl-diphenyl-phosphine oxide (Omnirad TPO) at 10% w/w and benzophenone at 5% w/w.

Ink solutions of the invention were prepared by combining the stock solution with compounds 1a, 3a, 4a or 5a. These will be referred to as solutions 1a, 3a, 4a and 5a respectively Compounds 4a and 5a were dissolved in DPGDA at 5 wt %. Compounds 1a and 3a were dissolved in DPGDA at 5 wt % with 5 wt % of dichloromethane.

Comparative solutions were made using the hydroxylated anthraquinone compounds 1, 3, 4 and 5 referred to as comparative solution 1, 3, 4, and 5 respectively. Compounds 4 and 5 were dissolved in DPGDA at 5 wt %. Compounds 1 and 3 were dissolved in DPGDA at 5 wt % with 5 wt % of dichloromethane.

A further comparative solution was produced by dissolving Methacrylated anthraquinone 4a in DCM. This solution will be referred to as comparative solution 4-1. The composition of the solution was 2 wt % compound 4a, 10 wt % Omnirad TPO, and 5 wt % benzoquinone, dissolved in DCM.

Example 3—Colour Fast Testing

Films of the solutions 1a, 3a, 4a and 5a produced in Example 2 were prepared on a coated substrate (Sheen card). These films were subsequently irradiated by UV. Curing of films was carried out by placing the uncured samples on a 2 m slider underneath a Baldwin iron-doped mercury arc lamp (model CA300) and a Phoseon 20 W/cm$^2$ LED lamp at 395 nm (model FP300 225X20WC395). For standard curing conditions the arc lamp was set to 60% and the LED lamp set to 50%, with the slider passing under the lamps once at a speed of 50 m/min. These curing conditions deliver a UVA dose of about 175 mJ/cm$^2$.

The first and second rows of photographs in FIG. 4(a) show the colours of these films before and after UV irradiation respectively. The methacrylated dyes do change during this curing process, but they remain deeply coloured.

As a control experiment, these films were compared to films produced using comparative solution 1, 3, 4, 4-1 and 5.

The third and fourth rows of photographs in FIG. 4(a) show films of comparative solution 1, 3, 4 and 5 before and after UV curing respectively. These films have lost most of their colour, becoming brown in most cases. It is proposed that binding to a polymer network stabilises the dye.

The results for comparative example 4-1 is shown in FIG. 4(b). The first row shows films of comparative solution 4-1 before UV curing. The second row shows films of comparative solution 4-1 after UV curing. The left column shows a film printed on uncoated porous card and the right column shows a film coated on sheen (shiny) card. The colour of the film after UV curing is considerably more brown than the films produced using solution 4a after UV curing. The film on the sheen card exhibits increased tackiness compared to any of the films produced using solutions 1a, 3a, 4a and 5a.

Figure 4:
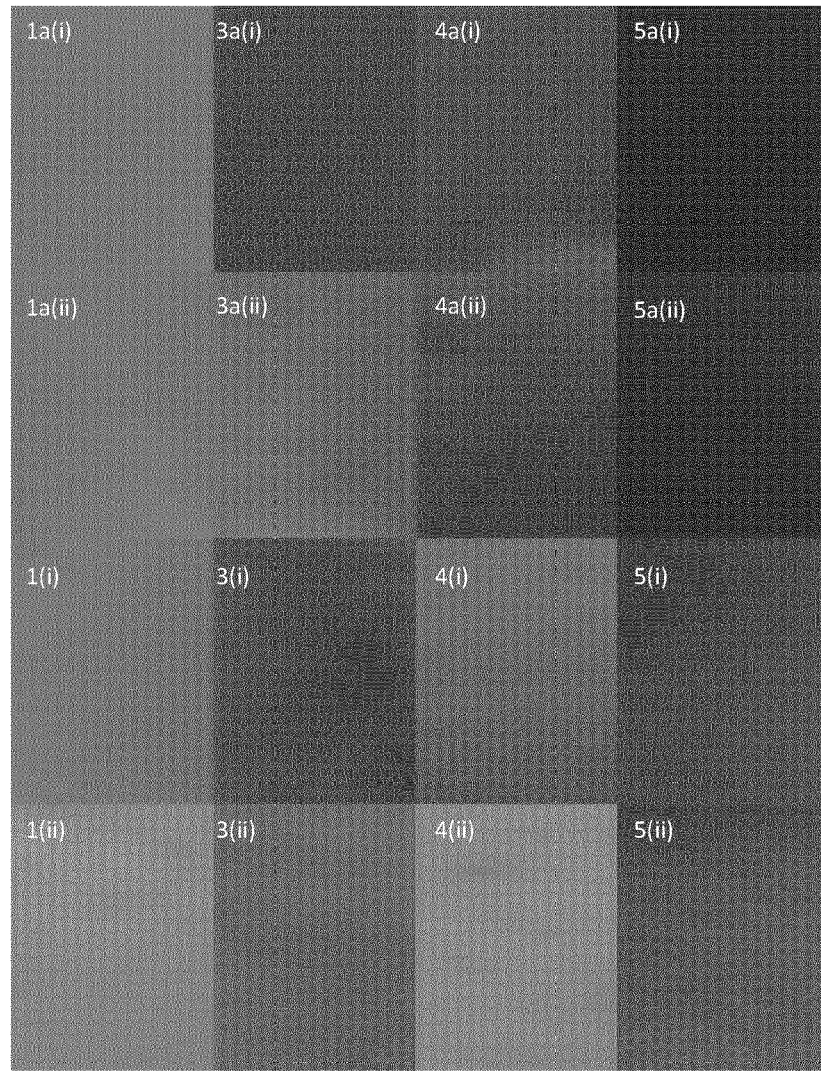
FIG. 4 is a series of photographs showing the colour change of films containing the functionalised dyes. (Top Row) 1a-5a(i) methacrylated dye films before curing (Second Row) 1a-5a(ii) Methacrylated dye films after UV curing (Third Row) 1-5 Non-methacrylated dye films before curing (Fourth Row) Non-methacrylated dye films after curing.
Figure 4:
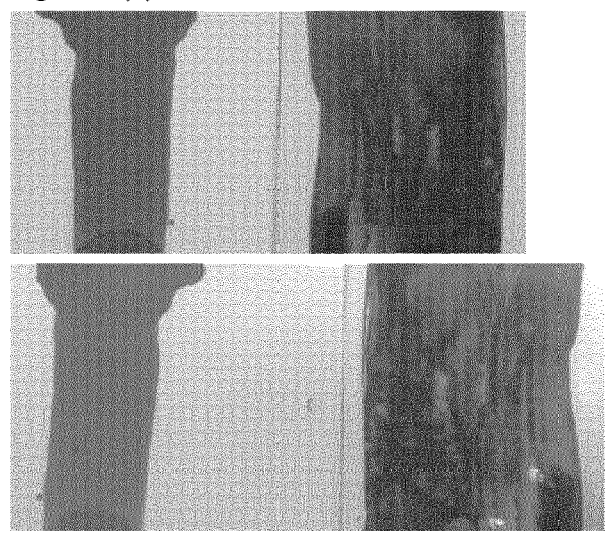

It is clear from the images of FIG. 4 that the methacrylated dye films retain colour, though the colour is changed; the non-methacrylated films are largely decolourised.

In order to test this result quantitatively, an X-Rite spectrophotometer was used to describe the colour of the films. This instrument analyses the light reflected from a substrate and gives a result in terms of a well-understood colour space. The CIELAB colour space was used for these experiment, in which each colour is described in terms of 3 co-ordinates; L* (the 'lightness'), a*, and b* (which are the position of the colour on the green-red and blue-yellow colour axes, respectively).

The CIELAB space was originally designed to correspond to perceptual uniformity (i.e. a change in the CIELAB co-ordinates is directly correlated to a visually perceived change). This model allows the colour differences between two surfaces (ΔE) to be quantified using equation (1), where $L_1^*$, $a_1^*$, $b_1^*$ describe the colour of the first surface and $L_2^*$, $a_2^*$ and $b_2^*$ describe the colour of the second surface.

$$\Delta E = \sqrt{(L_1^* - L_2^*)^2 + (a_1^* - a_2^*)^2 + (b_1^* - b_2^*)}  \quad (1)$$

Figure 5:
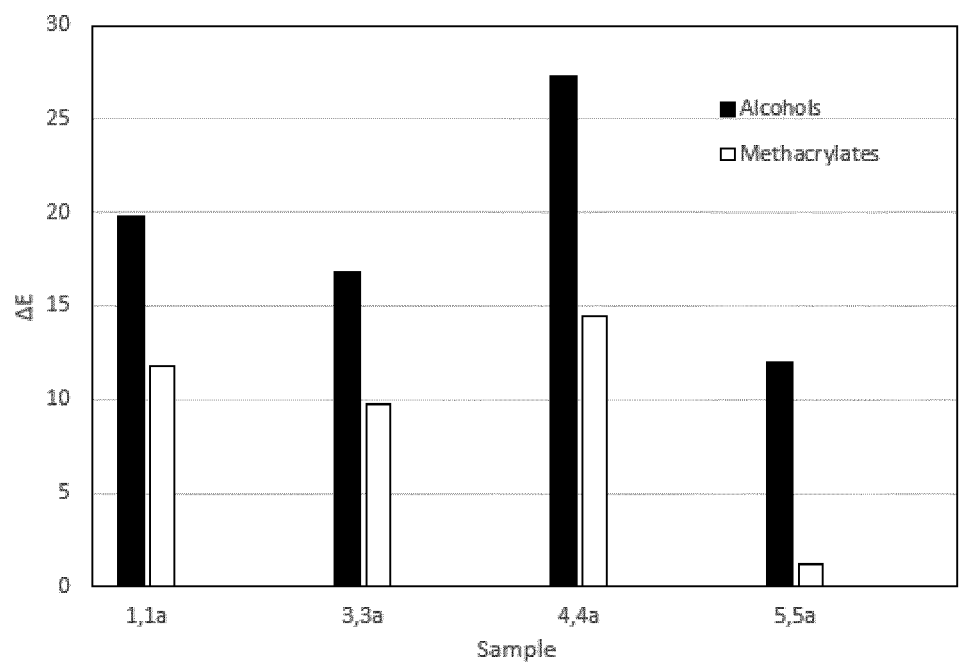
FIG. 5 is a graph showing the differences in delta E values for the alcohol-functionalised dyes vs the methacrylate-functionalised dyes.

For the films shown in FIG. 4(a), we measure and calculated the difference between the films before irradiation with UV, and the films after irradiation with UV. The results are summarised in FIG. 5 and in table 1 below.

TABLE 1

| | Colour Space calculations | | |
|---|---|---|---|
| Row Labels | Average of a* | Average of b* | Average of L* |
| 1(i)   | 38.09 | 23.49 | 47.65 |
| 1(ii)  | 21.74 | 27.87 | 57.99 |
| 1a(i)  | 47.41 | 33.90 | 46.56 |
| 1a(ii) | 37.92 | 27.12 | 48.60 |
| 3(i)   | 18.32 | 0.78  | 41.14 |
| 3(ii)  | 17.22 | 16.09 | 48.12 |
| 3a(i)  | 35.44 | 11.68 | 39.00 |
| 3a(ii) | 32.06 | 7.12  | 46.88 |
| 4(i)   | 22.32 | -3.60 | 46.04 |
| 4(ii)  | 11.62 | 15.94 | 61.76 |
| 4a(i)  | 34.38 | 3.00  | 40.63 |
| 4a(ii) | 20.15 | 5.29  | 40.61 |
| 5(i)   | 10.87 | -7.40 | 43.10 |
| 5(ii)  | 11.06 | 4.44  | 44.85 |
| 5a(i)  | 3.71  | 1.47  | 31.48 |

TABLE 1-continued

Colour Space calculations

| Row Labels | Average of a* | Average of b* | Average of L* |
|---|---|---|---|
| 5a(ii) | 4.04 | 1.69 | 32.66 |
| 4-1(i) | 25.15 | 71.17 | −16.21 |
| 4-1(ii) | 15.49 | 52.83 | 19.40 |

Each pair, "(i)" and "(ii)", of values in the table (and in FIG. 5) represents the change during irradiation, for solution 1a, 3a, 4a and 5a and comparative solutions 1, 3, 4 and 5. It is clear from these data that the change in colour is much larger for the hydroxyl-functionalised dyes (comparative solution 1, 3, 4 and 5), indicating that these dyes are degrading faster under UV irradiation.

Example 4—Aging

In order to test further how the films degrade with exposure to UV, the cured films were placed in a Bandol Wheel at 50° C.; this instrument is designed to accelerate the aging of the samples, by subjecting them to a dose of ultraviolet equivalent to approx. 2× the natural UV from the sun.

Figure 6:
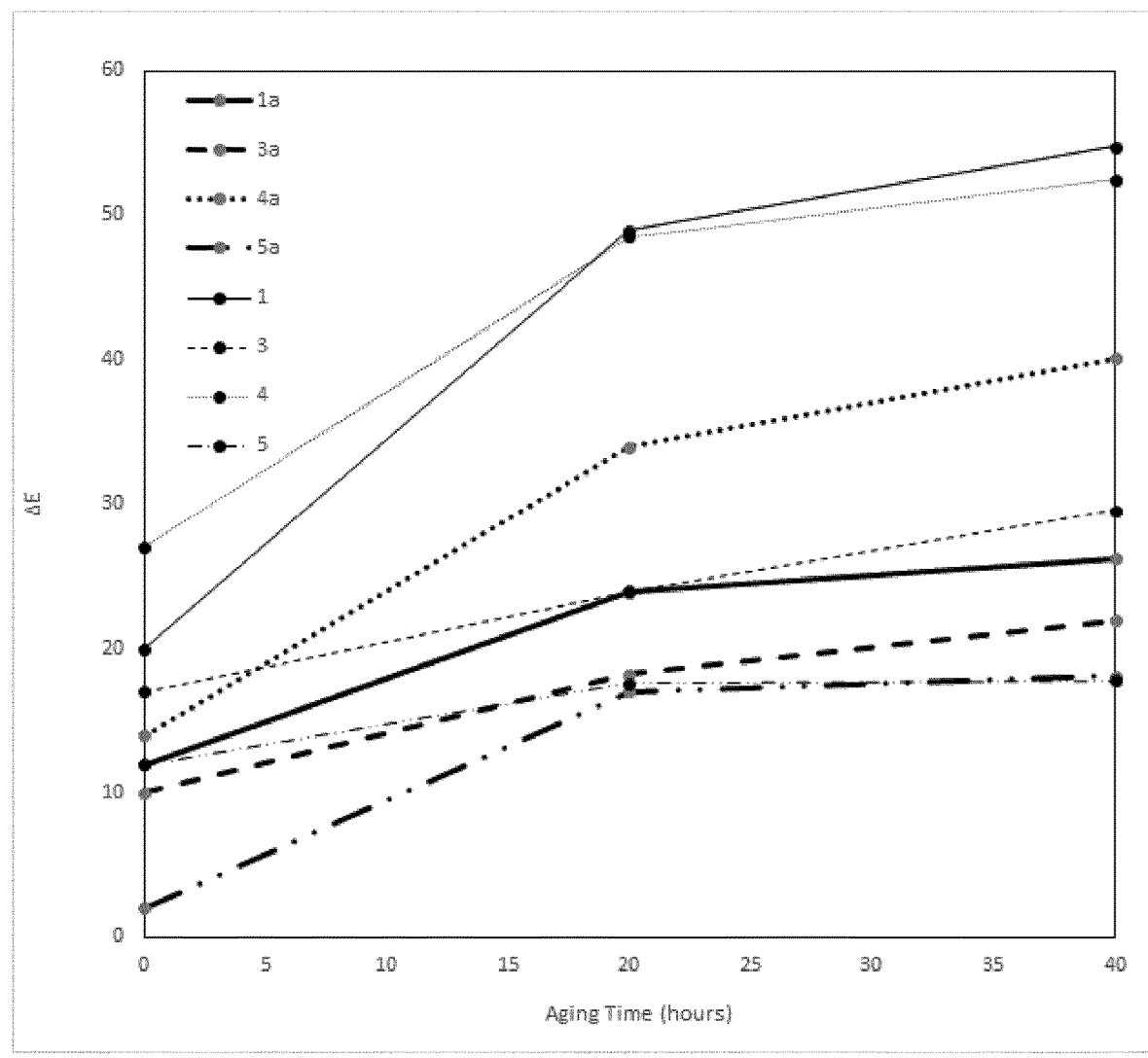
FIG. 6 is graph to showing the changing delta E values for both methacrylate- and alcohol-functionalised dyes during aging

FIG. 6 describes the changing ΔE value for each film as the aging time of the film increases. "Line 1a" refers to the films produced using solution 1a, "line 1" refers to the films produced using comparative solution 1 and so on.

In all cases other than 5/5a, the films containing hydroxylated dye continue to increase ΔE more rapidly than the films containing methacrylated dye.

Example 5—Testing Dye Binding

The cured films were soaked in solvents in order to test whether the colour leaches out of the cured film.

An uncoated sheen card was coated with a film produced by curing a solution containing the methacrylated dye 4a (i.e. solution 4a)

Four 1 cm² pieces of this film coated substrate were cut and cured for different curing times (curing time increasing from photographs a-d; film a was passed under the lamps once, film b twice, film c three times, and film d four times). The colour of the film remains purple during curing at all curing times.

Each of the four pieces was soaked in 5 ml acetone for 24 h in a separate container. In each case the acetone remained colourless and the substrate remains a purple colour during this process.

An uncoated sheen card was coated with a film produced by curing a solution containing the hydroxylated dye 4 (i.e. comparative solution 4). Four 1 cm² pieces of this film-coated substrate were cut and cured for the same times as for the methacrylated films (curing time increasing from e-h; film e was passed under the lamps once, film f twice, film g three times, and film h four times). In this case, the colour of the film turns brown during curing.

Each of the four pieces was soaked in 5 ml acetone for 24 h in a separate container. The acetone used for soaking became a bright pink colour in each case.

From these results, we propose that the methacrylated dye is covalently bound to the film while the hydroxylated dye is not.

Additionally, the methacrylated dye film is relatively stable under UV curing while the hydroxylated dye films quickly become brown. However, the dye leaching out of the hydroxylated dye films remains pink; we suggest that the brown colouration may be a surface degradation effect, leaving enough pink dye in the film for the soaking liquid to be coloured. Similar results were obtained when the soaking liquid was dichloromethane.

Figure 7:
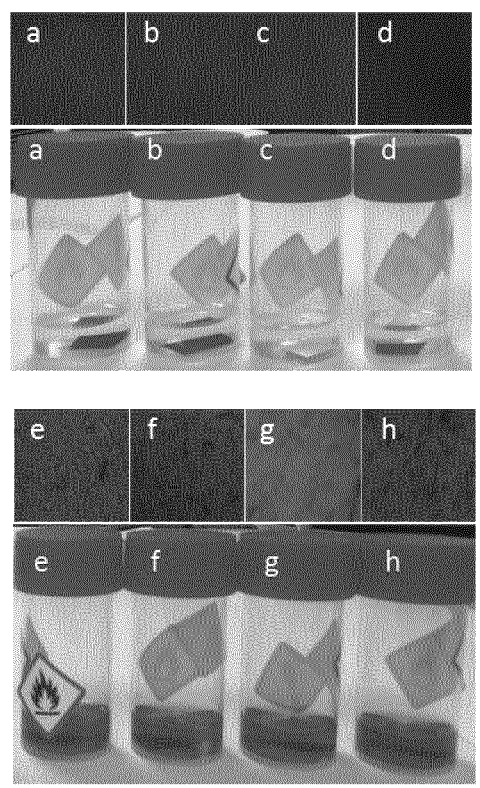
FIG. 7 shows the effect of solvent soaking on cured films. Samples (a)-(d) contain 2% methacrylated dye 4a; the film has been cured for increasing cure times from a to d. For each sample, a photograph of the cured film is shown above a photograph of a vial containing the film soaked in 5 ml acetone for 24 h. Samples (e)-(h) contain 2% hydroxylated dye 4; each film has been cured for the same time as the corresponding hydroxylated film above.

FIG. 7 shows the effect of soaking on the two coated substrates. From the images, it can be clearly seen that the colour of the cured film changes significantly more for the hydroxylated films during curing than for the corresponding methacrylated films.

Additionally, the dye leaches out of the films containing hydroxylated dye significantly more readily than those containing methacrylated dye. From these results it seems that the methacrylated dye is strongly bound into the cured film.

Example 6—Viscosity

The viscosity of the stock solution produced in Example 2 was measured at 11.5 mPa·S at 25° C.

Two further compositions of the invention were produced by combining 1 wt % and 5 wt % respectively of compound 4a with the stock solution.

The viscosity of each of the compositions of the invention was measured at 25° C. to be 11.3 mPa·S (1 wt % of 4a) and 11.7 mPa·S (4 wt % of 4a), respectively.

From this it seems that the dye monomer compounds do not contribute significantly to the viscosity of the ink compositions.

Example 7—Printing

A Fujifilm Dimatix inkjet (Model number DMP-2831) printer was used to print a logo from a solution containing 2% w/w of 4a dissolved in the stock solution described Example 2.

Figure 8:
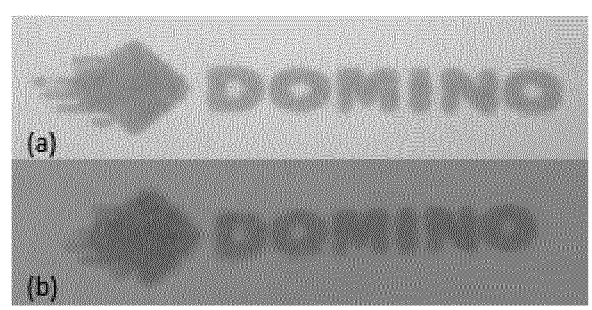
FIG. 8 shows photographs of (a) a logo printed from a solution containing the methacrylated dye 4a (b) the same film as in (a), after UV irradiation.

FIG. 8 (*a*) is a photograph of the resulting logo, printed on paper; FIG. 8 (*b*) shows the same logo after exposure to UV irradiation. The image quality and cure of the printed deposit is good. The ink did not visibly run when a drop of MEK was applied.

These results demonstrate that the presently claimed composition forms a viable ink for inkjet printing and UV curing.

The invention claimed is:

1. A curable inkjet ink composition comprising a dye monomer, a carrier monomer and an initiator wherein
the dye monomer has a chromophore moiety that is covalently bonded to two or more polymerizable functional groups and the dye monomer is present at 1.0 wt % or more based on total weight of the ink composition; and
the carrier monomer has at least one polymerizable functional group and is present at 50 wt % or more based on total weight of the ink composition.

2. The curable inkjet ink composition of claim 1 wherein the chromophore moiety is selected from the group consisting of an anthraquinone, an anthrapyridone, an anthrapyrimidine, an anthrapyrimidone, an isothiazoloanthrone, an azo dye, a bis-azo dye, a methine, a bis-methine, a coumarin, a 3-aryl-2,5-dioxypyrroline, a 3-aryl-5-dicyanomethylene-2-oxypyrroline, a perinone, a quinophthalone, a phthalocyanine, a metal phthalocyanine, a nitroarylamine, and a 2,5-diarylaminoterephthalic ester.

3. The curable inkjet ink composition of claim 2 wherein the chromophore moiety is an anthraquinone.

4. The curable inkjet ink composition of claim 1 wherein the two or more polymerizable functional groups of the dye monomer are independently selected from the group consisting of alkenyl, alkynyl, acrylate, methacrylate, maleate, fumarate and acrylamide functional groups.

5. The curable inkjet ink composition of claim 4 wherein the two or more polymerizable functional group of the dye monomer are methacrylate.

6. The curable inkjet ink composition of claim 1 wherein the dye monomer is difunctional.

7. The curable inkjet ink composition of claim 1 wherein the carrier monomer is a single monomer.

8. The curable inkjet ink composition of claim 1 wherein the carrier monomer is a mixture of two or more monomers.

9. The curable inkjet ink composition of claim 1 wherein the carrier monomer is multifunctional.

10. The curable inkjet ink composition of claim 1 wherein the at least one polymerizable functional group of the carrier monomer is selected from the group consisting of alkenyl, alkynyl, acrylate, methacrylate, maleate, fumarate and acrylamide functional groups.

11. The curable inkjet ink composition of claim 10 wherein the at least one polymerizable functional group of the carrier monomer is acrylate.

12. The curable inkjet ink composition of claim 11 wherein the carrier monomer is difunctional.

13. The curable inkjet ink composition of claim 1 wherein the initiator is a photoinitiator.

14. A printing method comprising the steps of providing an ink container containing the curable inkjet ink composition as defined in claim 1; directing a stream of droplets of the curable ink composition to a substrate and curing the printed ink composition.

15. The method according to claim 14 wherein the step of curing the printed inkjet ink composition comprises treating the printed inkjet ink composition to UV radiation.

16. The method of claim 15 wherein the printed inkjet ink composition is treated with multiple applications of UV radiation.

17. A substrate comprising a printed deposit produced by the method defined in claim 14.

18. The curable inkjet ink composition of claim 1 wherein the dye monomer is present at 30 wt % or less based on total weight of the ink composition.

* * * * *